US012726331B2

(12) United States Patent
Cheng et al.

(10) Patent No.: US 12,726,331 B2
(45) Date of Patent: Sep. 1, 2026

(54) METHOD OF MANAGING CARBON DATA USING BLOCKCHAIN NETWORK AND SYSTEM FOR THE SAME

(71) Applicant: The Hong Kong University of Science and Technology, Hong Kong (CN)

(72) Inventors: Jack Chin Pang Cheng, Hong Kong (CN); Yuqing Xu, Hong Kong (CN); Xingyu Tao, Hong Kong (CN); Moumita Das, Hong Kong (CN); Helen Hoi Ling Kwok, Hong Kong (CN); Hao Liu, Hong Kong (CN); Ka Lin Kuan, Hong Kong (CN); Kai Hon Alexis Lau, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 49 days.

(21) Appl. No.: 18/961,727

(22) Filed: Nov. 27, 2024

(65) Prior Publication Data

US 2025/0184115 A1 Jun. 5, 2025

Related U.S. Application Data

(60) Provisional application No. 63/606,563, filed on Dec. 5, 2023.

(51) Int. Cl.
*H04L 9/00* (2022.01)

(52) U.S. Cl.
CPC ................ *H04L 9/008* (2013.01); *H04L 9/50* (2022.05)

(58) Field of Classification Search
CPC .................................. H04L 9/008; H04L 9/50
(Continued)

(56) References Cited

U.S. PATENT DOCUMENTS 6,995,675 B2 * 2/2006 Curkendall ............ G06Q 50/02 340/572.1
11,769,091 B1 * 9/2023 Spinelli ............ G06Q 10/06313 705/7.23

(Continued)

FOREIGN PATENT DOCUMENTS

CN 115982769 A 4/2023
CN 116595571 A 8/2023

OTHER PUBLICATIONS

"Enhanced Traffic Carbon Emissions Data Sharing and Modeling via Blockchain and Personalized Federated Learning in IIOT Ecosystem", Zhang, Xinhuan; Hong Kong University of Science and Technology, by Liu, Hongjie; Yang, Fan, IEEE, Published date: Aug. 2025 (Year: 2025).*

(Continued)

*Primary Examiner* — Dant B Shaifer Harriman
(74) *Attorney, Agent, or Firm* — S&F/WEHRW

(57) ABSTRACT

There is provided a method of managing carbon data using a blockchain network. The method includes categorizing, by a processing device, each of one or more carbon data received from at least one user of the blockchain network into respective privacy levels. Each of the respective privacy levels represents a privacy requirement corresponding to each of the one or more carbon data. The method further includes encrypting, by the processing device, each of the one or more categorized carbon data using one of a plurality of encryption schemes. The one of the plurality of encryption schemes is determined based on the privacy level of the carbon data. The method further includes generating, by the processing device, one or more blockchain transactions corresponding to each of the one or more encrypted carbon data and transmitting, by the processing device, the one or more blockchain transactions into the blockchain network.

12 Claims, 23 Drawing Sheets

(58) Field of Classification Search
USPC ........................................................ 380/28
See application file for complete search history.

(56) References Cited

U.S. PATENT DOCUMENTS

| | | | | |
|---|---|---|---|---|
| 12,229,702 | B2 * | 2/2025 | Abramowitz | G06Q 10/0635 |
| 2018/0365610 | A1 * | 12/2018 | Klett | G06Q 10/0637 |
| 2021/0216978 | A1 * | 7/2021 | Diaz | G06Q 20/123 |
| 2021/0314143 | A1 * | 10/2021 | Conner | H04L 9/3239 |
| 2022/0180374 | A1 * | 6/2022 | Cooner | G06Q 20/145 |
| 2022/0276222 | A1 * | 9/2022 | Beal | G01N 33/0031 |
| 2022/0327538 | A1 * | 10/2022 | Kumar | H04L 9/3263 |
| 2022/0343433 | A1 * | 10/2022 | Yan | G06Q 40/06 |
| 2024/0249292 | A1 * | 7/2024 | Lu | G06Q 30/0283 |
| 2025/0184115 | A1 * | 6/2025 | Cheng | H04L 9/3239 |
| 2026/0094186 | A1 * | 4/2026 | Blaikie, III | G06Q 30/0255 |

OTHER PUBLICATIONS

"Lattice-Like Blockchain System for Maintaining he Data Privacy in the Distributed Computation of Carbon Emission," IEEE, Han, Zhuopu; Ding, Tao; Mu, Chenggang; Shen, Xin; Li, Jiahao; Shahidelpour, Mohammed; Published date: Sep. 5, 2024. (Year: 2024).*

First Office Action of Application No. or Patent No. 202411775108.8 issued from the China National Intellectual Property Administration issued on Nov. 15, 2025.

Y. Fernando et al., The blockchain-enabled technology and carbon performance: Insights from early adopters, Technology in Society 64 (2021) 101507.

J. Woo et al., Applying blockchain technology for building energy performance measurement, reporting, and verification (MRV) and the carbon credit market: A review of the literature, Building and Environment 205 (2021) 108199.

M. Mubarik et al., Impact of blockchain technology on green supply chain practices: evidence from emerging economy, MEQ 32 (2021) 1023-1039.

Y. Pan et al., Application of blockchain in carbon trading, Energy Procedia 158 (2019) 4286-4291.

M. Wang et al., Blockchain Technology and Its Role in Enhancing Supply Chain Integration Capability and Reducing Carbon Emission: A Conceptual Framework, Sustainability 12 (2020) 10550.

B. Wang et al., Applying blockchain technology to ensure compliance with sustainability standards in the PPE multi-tier supply chain, International Journal of Production Research 61 (2023) 4934-4950.

K. Liu et al., The framework of the integration of carbon footprint and blockchain: using blockchain as a carbon emission management tool, in: A.H. Hu, M. Matsumoto, T.C. Kuo, S. Smith (Eds.), Technologies and Eco-innovation towards Sustainability I, Springer Singapore, Singapore, 2019, pp. 15-22.

A. Zhang et al., Blockchain-based life cycle assessment: An implementation framework and system architecture, Resources, Conservation and Recycling 152 (2020) 104512.

Z. Shu et al., Blockchain-enhanced trading systems for construction industry to control carbon emissions, Clean Technologies and Environmental Policy, (2022) 24(6):1851-70.

A. Al Sadawi et al., A comprehensive hierarchical blockchain system for carbon emission trading utilizing blockchain of things and smart contract, Technological Forecasting and Social Change 173 (2021) 121124.

* cited by examiner

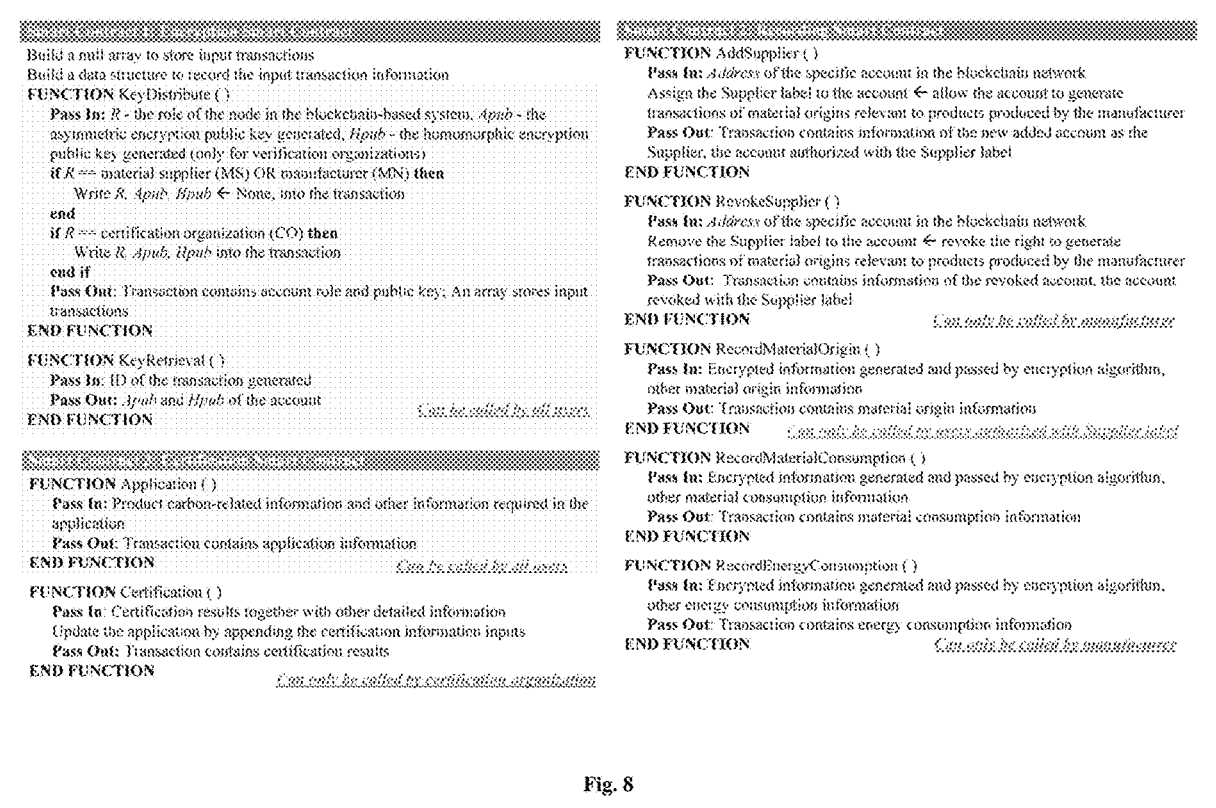

Build a null array to store input transactions
Build a data structure to record the input transaction information

FUNCTION KeyDistribute ( )
  Pass In: *R* - the role of the node in the blockchain-based system, *Apub* - the asymmetric encryption public key generated, *Hpub* - the homomorphic encryption public key generated (only for verification organizations)
  if *R* == material supplier (MS) OR manufacturer (MN) then
    Write *R*, *Apub*, *Hpub* ← None, into the transaction
  end
  if *R* == certification organization (CO) then
    Write *R*, *Apub*, *Hpub* into the transaction
  end if
  Pass Out: Transaction contains account role and public key; An array stores input transactions
END FUNCTION

FUNCTION KeyRetrieval ( )
  Pass In: ID of the transaction generated
  Pass Out: *Apub* and *Hpub* of the account
END FUNCTION *Can be called by all users*

FUNCTION Application ( )
  Pass In: Product carbon-related information and other information required in the application
  Pass Out: Transaction contains application information
END FUNCTION *Can be called by all users*

FUNCTION Certification ( )
  Pass In: Certification results together with other detailed information
  Update the application by appending the certification information inputs
  Pass Out: Transaction contains certification results
END FUNCTION *Can only be called by certification organization*

FUNCTION AddSupplier ( )
  Pass In: *Address* of the specific account in the blockchain network
  Assign the Supplier label to the account ← allow the account to generate transactions of material origins relevant to products produced by the manufacturer
  Pass Out: Transaction contains information of the new added account as the Supplier, the account authorized with the Supplier label
END FUNCTION

FUNCTION RevokeSupplier ( )
  Pass In: *Address* of the specific account in the blockchain network
  Remove the Supplier label to the account ← revoke the right to generate transactions of material origins relevant to products produced by the manufacturer
  Pass Out: Transaction contains information of the revoked account, the account revoked with the Supplier label
END FUNCTION *Can only be called by manufacturer*

FUNCTION RecordMaterialOrigin ( )
  Pass In: Encrypted information generated and passed by encryption algorithm, other material origin information
  Pass Out: Transaction contains material origin information
END FUNCTION *Can only be called by users authorized with Supplier label*

FUNCTION RecordMaterialConsumption ( )
  Pass In: Encrypted information generated and passed by encryption algorithm, other material consumption information
  Pass Out: Transaction contains material consumption information
END FUNCTION

FUNCTION RecordEnergyConsumption ( )
  Pass In: Encrypted information generated and passed by encryption algorithm, other energy consumption information
  Pass Out: Transaction contains energy consumption information
END FUNCTION *Can only be called by manufacturer*

Fig. 8

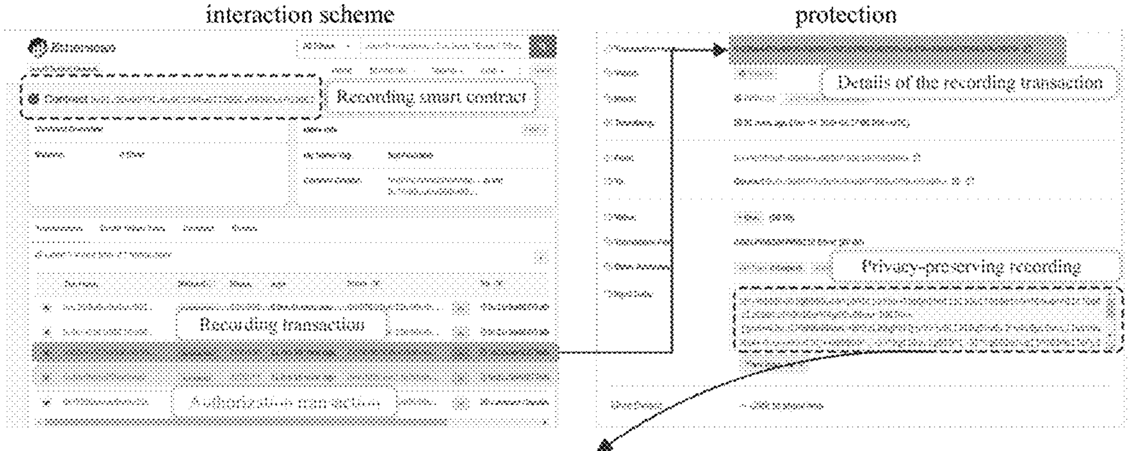

| | |
|---|---|
| Material supplier | *AhRtpBYDCy2fod+TbpQn2HmtipZa3ULKGzbetkNHfChwa+rBZX7Eo4cizCbbXzfh 8N1CqMfAgfCx89ourJU6TA==* |
| Material type | *gh6+4U5LtDYBNXwMWdaQfbMlzL02gMtKQjrYfjyGLSATGq5hVG/3Mv4LGpLEw YL/lstYWuRz4+/bzsyeFl6UlQ==* |
| Material EF | *0.684* |
| Unit of material EF | *kgCO2e/kg* |
| Transportation EF | *0.076* |
| Unit of transportation EF | *kgCO2e/kg* |
| Hash value of material EF proof | *jMY0iMbITeFy3KIwjt10muJ8TtgCG54vbZNRoNVhqJCzCU95gSUy4oRTAfpHVXU wfVXHc7+VLhO3eR3Yb9fKMg==* |
| Hash value of material transportation proof | *dkXnLL8FxheQbJUHygYscyb9/hM4kA8eKwbSZHSZnaI2QqbZdQlH3PE4L77fUVF lzjy8hoTgkB3961vpm22RCg==* |

Fig. 14

Fig. 15B
Activity 3: Certification organization broadcasts the certificate after verification
Application for CMP carbon certification
Manufacturer Company
Product Category
Concrete, 45/20D 125mm Slump
Product Batch ID
Carbon Footprint of Product
330
Unit of Carbon Footprint
kgCO2e/m3
The set of TX IDs of material and energy consumption
Issue date
2023-01-01
End date
2025-01-01
Issuing organization
Hong Kong Green Building Council
Certificate No.
Certificate information

(a) Blockchain details of the application transaction (b) Blockchain details of the certification transaction

METHOD OF MANAGING CARBON DATA USING BLOCKCHAIN NETWORK AND SYSTEM FOR THE SAME

CROSS-REFERENCE TO RELATED APPLICATIONS

The present application claims priority from U.S. Provisional Patent Application No. 63/606,563, filed on Dec. 5, 2023, which is hereby incorporated by reference in its entirety.

FIELD OF INVENTION

The present invention relates broadly, but not exclusively, to methods of managing carbon data using a blockchain network and systems for the same.

BACKGROUND

As one of the biggest resource consumers and carbon emitters, the construction industry plays a crucial role in global carbon reduction. Carbon certification or labelling schemes are efficient ways to assess and report the carbon footprints of construction materials and products (CMPs), providing the foundation for carbon management at the CMP level. However, existing carbon management for CMP certification relies heavily on traditional centralized data management tools, which suffer from data non-transparency and manipulation problems, making carbon footprints unreliable and hard to track.

Therefore, a need exists to provide methods of managing carbon data using a blockchain network and systems for the same.

SUMMARY

According to a first aspect of the present invention, there is provided a method of managing carbon data using a blockchain network. The method includes categorizing, by a processing device, each of one or more carbon data received from at least one user of the blockchain network into respective privacy levels. Each of the respective privacy levels represents a privacy requirement corresponding to each of the one or more carbon data. The method further includes encrypting, by the processing device, each of the one or more categorized carbon data using one of a plurality of encryption schemes. The one of the plurality of encryption schemes is determined based on the privacy level of the carbon data. The method further includes generating, by the processing device, one or more blockchain transactions corresponding to each of the one or more encrypted carbon data and transmitting, by the processing device, the one or more blockchain transactions into the blockchain network.

Each of the one or more carbon data may include basic product information and/or manufacturing information of at least one construction material or product. Further, the privacy requirement of each of the one or more carbon data may be predetermined based on the basic product information and/or the manufacturing information.

In embodiments of the present invention, the method may include mapping, by the processing device, each of the one or more carbon data to a corresponding privacy level based on the predetermined privacy requirement.

In one embodiment, the respective privacy levels may include first, second and third privacy levels. The first privacy level carbon data may be accessible to all users in the blockchain network, the second privacy level carbon data may be accessible to users authorized by the owner of the carbon data, and the third privacy level carbon data may be accessible only by the owner of the carbon data.

In this embodiment, the plurality of encryption schemes may include an asymmetric encryption scheme and a homomorphic encryption scheme. The first and second level privacy carbon data may be encrypted using the asymmetric encryption scheme, and the third level privacy level carbon data may be encrypted using the homomorphic encryption scheme.

In embodiments of the present invention, the one or more blockchain transactions may be generated using one or more smart contracts. At least one of the one or more smart contracts may be configured to only allow at least one user authorized by an owner of the at least one of the one or more smart contracts to invoke at least one function of the at least one of the one or more smart contracts.

Additionally, the method may be implemented based on a blockchain-based model. The blockchain-based model may include an architecture having a data access layer, a data privacy layer and a smart contract layer. The categorizing step may be performed in the data access layer, the encrypting step may be performed in the data privacy layer, and the generating step may be performed in the smart contract layer.

According to a second aspect of the present invention, there is provided a system for managing carbon data using a blockchain network. The system includes a processing device configured to categorize each of one or more carbon data received from at least one user of the blockchain network into respective privacy levels. Each of the respective privacy levels represents a privacy requirement corresponding to each of the one or more carbon data. The processing device is further configured to encrypt each of the one or more categorized carbon data using one of a plurality of encryption schemes. The one of the plurality of encryption schemes is determined based on the privacy level of the carbon data. The processing device is further configured to generate one or more blockchain transactions corresponding to each of the one or more encrypted carbon data and transmit the one or more blockchain transactions into the blockchain network.

In embodiments of the present invention, the processing device may be further configured to map each of the one or more carbon data to a corresponding privacy level based on the predetermined privacy requirement.

In one embodiment, the respective privacy levels may include first, second and third privacy levels. The first privacy level carbon data may be accessible to all users in the blockchain network, the second privacy level carbon data may be accessible to users authorized by the owner of the carbon data, and the third privacy level carbon data may be accessible only by the owner of the carbon data.

In this embodiment, the plurality of encryption schemes may include an asymmetric encryption scheme and a homomorphic encryption scheme. The first and second level privacy carbon data may be encrypted using the asymmetric encryption scheme, and the third level privacy level carbon data may be encrypted using the homomorphic encryption scheme.

In embodiments of the present invention, the one or more blockchain transactions may be generated using one or more smart contracts. At least one of the one or more smart contracts may be configured to only allow at least one user authorized by an owner of the at least one of the one or more smart contracts to invoke at least one function of the at least one of the one or more smart contracts.

In embodiments of the present invention, the processing device may be further configured to implement a blockchain-based model. The blockchain-based model may include an architecture having a data access layer, a data privacy layer and a smart contract layer. The categorizing of each of one or more carbon data received from at least one user of the blockchain network into respective privacy levels may be performed in the data access layer. The encrypting of each of the one or more categorized carbon data using one of a plurality of encryption schemes may be performed in the data privacy layer. The generating of one or more blockchain transactions corresponding to each of the one or more encrypted carbon data may be performed in the smart contract layer.

BRIEF DESCRIPTION OF THE DRAWINGS

Embodiments of the invention will be better understood and readily apparent to one of ordinary skill in the art from the following written description, by way of example only, and in conjunction with the drawings, in which:

FIG. 8 shows exemplary algorithms for implementing different smart contracts, in accordance with an embodiment.

FIG. 14 shows validation results of a first example scenario, in accordance with an embodiment.

DETAILED DESCRIPTION

Figure 1:
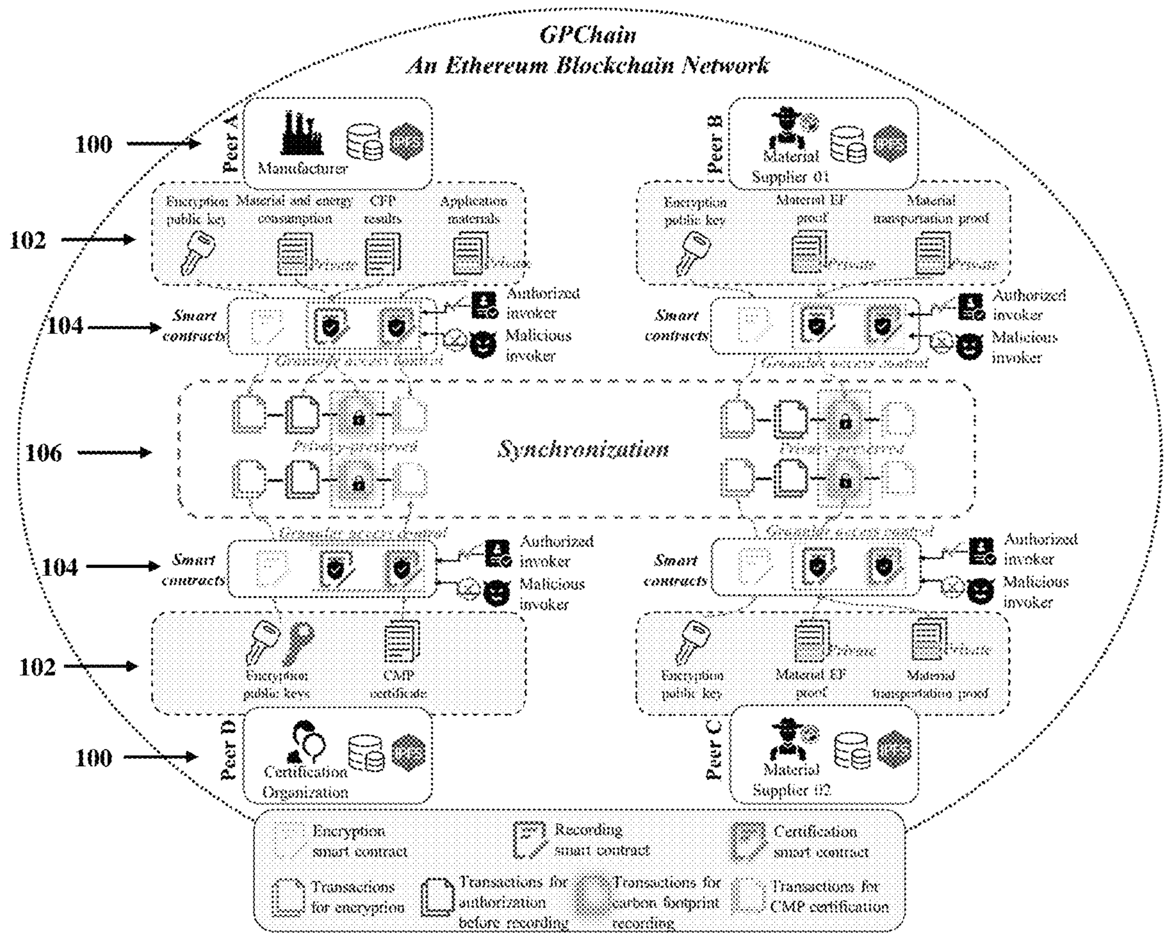
FIG. 1 shows a flow diagram illustrating an exemplary framework of managing carbon data using a blockchain network, in accordance with an embodiment.

Embodiments of the present invention will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a conventional computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM, GPRS, 3G or 4G mobile telephone systems, as well as other wireless systems such as Bluetooth, ZigBee, Wi-Fi. The computer program when loaded and executed on such a computer effectively results in an apparatus that implements the steps of the preferred method.

The present invention may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC) or Field Programmable Gate Array (FPGA). Numerous other possibilities exist. Those skilled in the art will appreciate that the system can also be implemented as a combination of hardware and software modules.

In the following description, the term "module" can refer to software, a hardware element, or a combination of both.

An Application Programming Interface (API) enables software and applications to communicate with each other. It is a software-to-software interface that allows for separate parties to communicate with each other without any previous user knowledge or intervention. In general terms, it is a set of clearly defined methods of communication between various software components.

This specification uses the term "configured to" in connection with systems, apparatus, and computer program components. For a system of one or more computers to be configured to perform particular operations or actions means that the system has installed on its software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

As used herein, the term "processing device" refers to any hardware or system configured to perform computational tasks. In the context of blockchain, the processing device can execute processes related to the validation, verification, and recording of transactions on a blockchain network. This can include tasks such as executing consensus algorithms (e.g., Proof of Work, Proof of Stake), generating and verifying cryptographic hashes, and validating digital signatures for secure transactions. The processing device may further handle the execution of smart contracts, data encryption, and the propagation of blockchain data across a distributed network. Additionally, the processing device can store portions of the blockchain ledger, maintaining transaction history, and ensuring the integrity and immutability of the blockchain data. The processing device may be configured to communicate with other nodes in the network, synchronize blockchain states, and perform other blockchain-based services.

INTRODUCTION

The building and construction industry accounted for over 34% of energy demand and around 37% of energy and process-related $CO_2$ emissions in 2021. Therefore, the building and construction industry is facing increasing pressure to reduce its life cycle carbon emissions. While various carbon reduction methods are used for reducing energy consumption during the building operation stage, the importance of reducing embodied carbon from the construction stage cannot be undermined, of which embodied carbon from the construction stage accounts for nearly 30% of life cycle greenhouse gas (GHG) emissions for buildings. Of various emission sources at the construction stage, extraction and manufacturing of construction materials contribute around 70% of the GHG emissions. In particular, cement production accounts for about 5-8% of manmade $CO_2$ emissions, and the steel and iron production generates around 7% of $CO_2$ emissions globally. Moreover, the transportation of raw materials to product manufacturing plants is energy-intensive, especially for the international transportation of raw materials over long distances. Therefore, developing strategies to facilitate carbon management at the construction material and product (CMP) level is essential to meet emission reduction targets in the building and construction industry.

Further, due to the importance of reducing carbon emissions from CMPs, numerous efforts have been directed towards carbon management over their life cycles. For example, a series of international standards have been published to identify the standardized process and steps of managing carbon footprints from the product level. Based on the principles and guidelines provided by these standards, various carbon certification or labelling schemes for CMPs have been developed in different regions and they serve as practical and meaningful yardsticks to help construction companies effectively measure and manage the carbon footprints of CMPs. These schemes are public commitments in that the carbon footprints of CMPs have been measured and certified by professional organizations or governmental departments at environmentally friendly levels, which serve as efficient carbon management tools for the credible assessment and public reporting of CMP carbon footprints. However, the existing carbon certification or labelling schemes for CMPs have been challenged for not providing enough transparent carbon footprint data. The use of traditional centralized data management methods in these schemes also makes it difficult to verify the reliability and authenticity of carbon footprints. Moreover, some companies take advantage of the data transparency loophole for "greenwashing" such that misleading environmental claims are made through falsifying carbon data or worshipping false labels to achieve more carbon credits or green financing, resulting in negative effects on customer satisfaction and ultimately reducing company competitiveness. Others may even attack centralized environmental platforms' servers to inject false data to realize sustainability propaganda. Therefore, due to the carbon data transparency and reliability problems caused by the existing carbon management methods, public concerns about carbon data fraud have been raised.

As an emerging and promising technology, blockchain can offer a powerful solution to mitigate data transparency and reliability problems. Unlike centralized systems, blockchain typically operates under a distributed peer-to-peer network without intermediaries, which minimizes reliance on centralized organizations. Thus, data transparency and reliability can be obtained using blockchain, and at the same time, data traceability can be improved by blockchain via easy-to-identify and immutable information records. Due to these advantages that the blockchain can offer, it can serve as a transparent, reliable, and traceable data management tool for managing the carbon footprints of CMPs during the certification process. Without an intermediary or central authority, the carbon footprints of CMPs can be maintained collectively by corresponding stakeholders/users (e.g., raw material suppliers, manufacturers, and certification organizations) in a transparent environment, which facilitates the reliability of carbon footprint data in CMP certification. In addition, blockchain can also provide users with efficient tracking functions, helping clients or other users to quickly identify the certified CMPs' carbon footprints.

Although blockchain can provide great potential in the application of carbon management during CMP certification, challenges faced through applying blockchain in this field has yet to be addressed. One main challenge is the leakage of sensitive carbon footprint data during blockchain-based CMP certification. For a type of CMP from a manufacturer, certain carbon data, such as partner material suppliers, consumption quantity of materials and consumption of energy, during manufacturing is private and sensitive. Yet, in order to assess the carbon footprints of the CMP during the certification process, detailed knowledge of material suppliers and consumption quantities are required. Inappropriate data storage and sharing mechanisms of private and sensitive carbon data may cause leakage of commercial secrets, such as the CMP manufacturing formula of raw materials and procurement strategies, which could benefit manufacturers' competitors and damage the interests of CMP manufacturers. Hence, disclosing such proprietary information tends to raise stakeholders' concerns. For instance, competitors might use the manufacturer's GHG emission to assess its operational growth and efficiency, while non-governmental organizations (NGOs) may use the same information to exert pressure on the manufacturer to improve environmental performance. Since data stored in the blockchain is typically transparent to all users in the blockchain network, it can be difficult to engage manufacturers to record the carbon data required for CMP certification on the blockchain network. Another challenge can arise from uncontrolled user interactions in the blockchain network to generate carbon transactions. Particularly, interactions with the blockchain can typically be invoked by any user in the blockchain network via smart contracts, i.e., any users can interact with the blockchain to generate any type of transaction including transactions of certification results. However, certification transactions are only valid when they are generated by the responsible certification organizations. Otherwise, the credibility of certification results could be negatively affected and the frequency of having invalid certification transactions can also be increased. Therefore, it is important to address these challenges when applying blockchain to CMP certification. The present disclosure addresses, among other things, the following questions:

1) How can blockchain be applied to enable decentralization and transparency in both reporting and certifying the carbon footprints of CMPs?
2) How to facilitate carbon data privacy and secure user interactions with blockchain during the certification process under a decentralized blockchain environment for CMP certification?

Thus, embodiments of the present disclosure provide a decentralized blockchain-based framework that is integrated with carbon data protection schemes and secure user interactions to provide a solution for transparent, reliable, and traceable carbon data management towards CMP certification. Two example objectives of the present disclosure are as follows:

1) To provide a blockchain-based framework and workflow for decentralized and transparent carbon management towards CMP certification.
2) To provide carbon data privacy-preserving schemes and secure user interaction mechanisms using the blockchain-based framework.

Design and Development of GPChain

As described above, embodiments of the present disclosure provide a decentralized blockchain-based framework, also described interchangeably with the term "GPChain", for carbon management towards CMP certification. FIG. 1 shows an exemplary framework of the GPChain. With reference to FIG. 1, at 100, multiple users in a blockchain network, i.e., manufacturer 1, material supplier 1, material supplier 2 and the certification organization, are involved in the blockchain-based carbon footprint recording and certification, Further, at 100, an Ethereum blockchain network, for example, is integrated with traditional databases and an InterPlanetary File System (IPFS) is used for storing and sharing relevant carbon data and files for CMP certification. It should be understood that the users are not limited to those previously described and the person skilled in the art would be able to recognize other users in a CMP supply chain. At 102, the inputs from the three types of users are identified, respectively, in accordance with different information requirements in CMP certification for the respective types of users. These data inputs can be, for example, obtained from original carbon databases or the IPFS system outputs. At 104, these data inputs can be processed using a corresponding smart contract to generate different types of transactions for CMP certification in the blockchain network. Considering the privacy requirements of certain carbon data, transactions containing private or sensitive carbon data can be privacy-preserved in embodiments of the present disclosure (details will be described in later sections). Furthermore, embodiments of the present disclosure can also provide smart contracts with granular access control such that user interactions (invoking smart contract functions) can be controlled, or in some cases restricted, to enhance GPChain's security. At 106, all transactions generated by the users are distributed and synchronized in GPChain for user communication and public supervision toward CMP certification.

Figure 2:
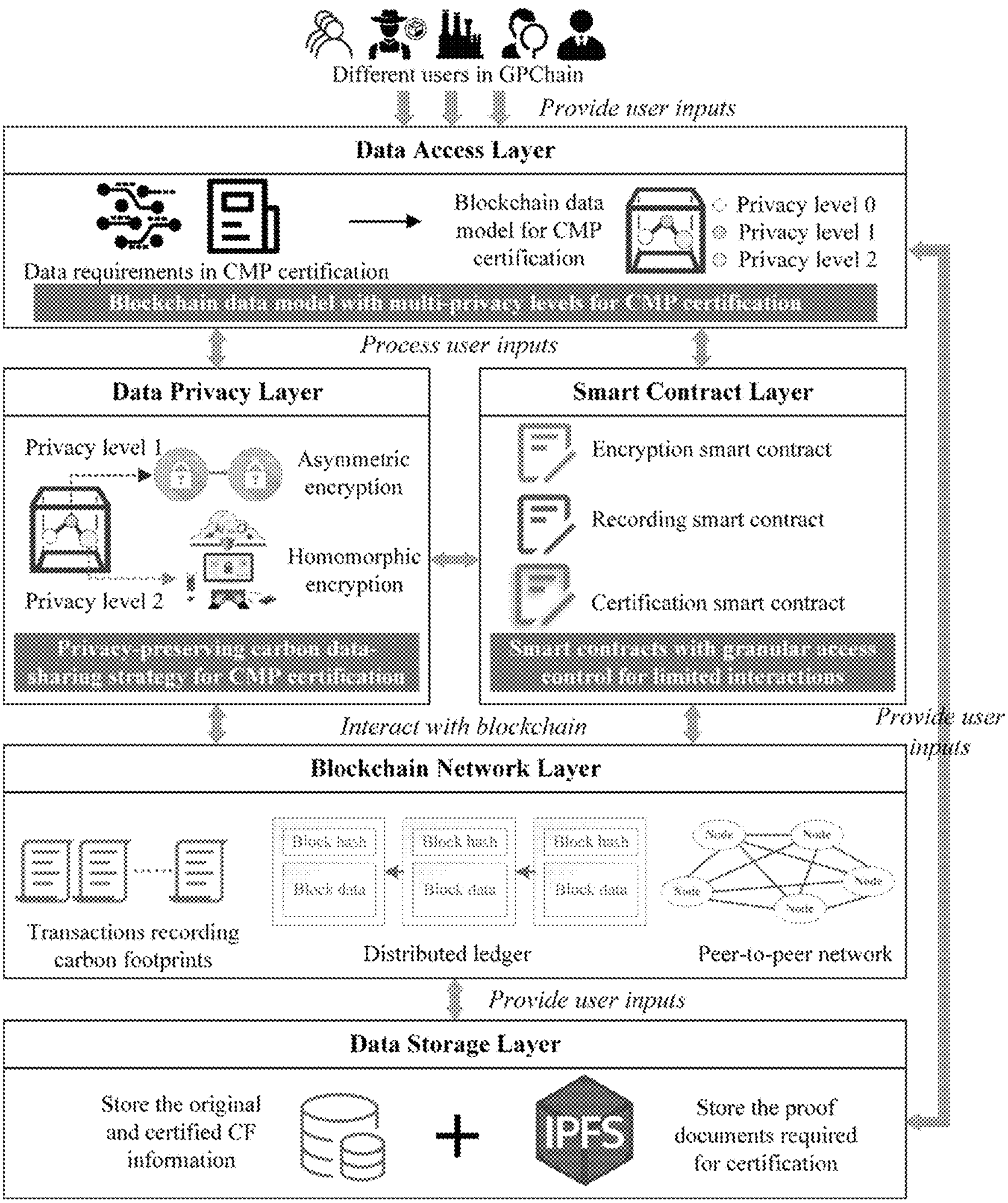
FIG. 2 shows another flow diagram illustrating an exemplary framework of managing carbon data using a blockchain network, in accordance with an embodiment.

FIG. 2 shows an exemplary modular architecture of GPChain. As shown in FIG. 2, the GPChain can include, among other things, i) a Data Access Layer, ii) a Data Privacy Layer, iii) a Smart Contract Layer, iv) a Blockchain Network Layer and v) a Data Storage Layer. Firstly, the data access layer is designed to receive user inputs, i.e., carbon footprint data required for CMP certification, from different types of users in the blockchain network, which includes data attributes and process files required in CMP certification. In this layer, a data model with multiple privacy levels for blockchain-based CMP certification is provided to identify which of the received carbon data should be transparent or can only be accessible by authorized user(s). Based on the data model, a privacy-preserving carbon data-sharing strategy is adopted in the data privacy layer, which considers different requirements when sharing sensitive and private carbon data in the blockchain network. The data privacy layer can integrate asymmetric encryption and homomorphic encryption schemes to pre-process carbon data at different privacy levels before blockchain transactions are generated based on the received carbon data for secure storage and sharing. For example, only authorized users can access the original sensitive carbon data using corresponding decryption keys for verification and certification objectives, which can facilitate carbon data security in the blockchain network and relieve manufacturers' concerns about the leakage of sensitive carbon data during CMP certification. The processed carbon data is further processed in the smart contract layer using the distributed ledgers in the blockchain network for immutable carbon data storage, sharing, and communication. In particular, granular access control smart contracts can be provided in GPChain to allow only authorized users to invoke and generate corresponding transactions by controlling, or in some cases restricting, user interactions within the blockchain network, which enhances smart contract security and certification credibility. After generation of the blockchain transactions based on the received carbon data for CMP certification via the smart contract layer, these transactions can be distributed in a decentralized and transparent blockchain network, e.g., Etherium blockchain network, etc. It may be useful to note that, since the CMP certification is a public commitment for both industry applications and social supervision, the required level of decentralization and transparency to maintain data integrity and security is much higher than in private enterprise applications. In such case, Ethereum may be preferred when compared to other blockchain platforms, such as Hyperledger Fabric. However, the person skilled in the art would be able to recognize other blockchain platforms that are suitable for such application. Finally, the data storage layer combines traditional databases and IPFS to store the original carbon data and proof documents provided for certification, respectively. It should be understood that the platform for storing the carbon data and/or carbon-related documents is not limited only to IPFS but can encompass other suitable platforms or similar services. Additionally, when a user attempts to provide original carbon-related documents for certification, the documents are first uploaded to the IPFS platform to generate a unique file value, which can then be processed using the smart contract and be distributed in the blockchain network. The details of the key technical components of GPChain are described in the following sections.

Multi-Privacy Carbon Data Model for Blockchain-Based CMP Certification

Figure 3:
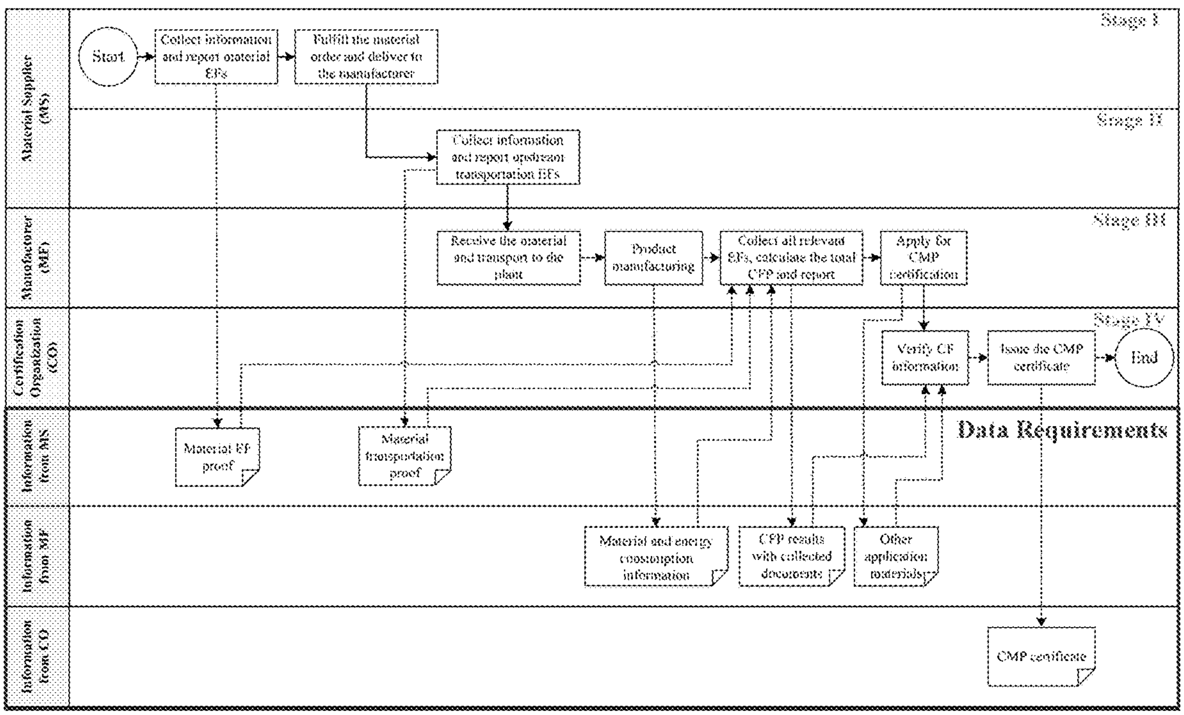
FIG. 3 shows a flow diagram illustrating an exemplary process of a CMP certification lifecycle, in accordance with an embodiment.

FIG. 3 shows an exemplary process map of a life cycle for CMP certification using GPChain. As shown in FIG. 3, the process includes major information flow and data exchange across different users in the CMP carbon certification. There are four main stages in the process map, namely (1) Stage I: collection and reporting of carbon emissions from raw material extraction by material suppliers, (2) Stage II: collection and reporting of carbon emissions from upstream transportation during the material delivery process by material suppliers, (3) Stage III: recording and calculating carbon emissions from CMP manufacturing by the manufacturer, and (4) Stage IV: product certification process and certificate issuance by the professional certification organization. In the first two stages, i.e., Stages I and II, the proof documents of the material's emission factor and transportation details in the delivery are sent from material suppliers to the manufacturer. After receiving the material and relevant information, the manufacturer starts to record carbon footprints generated from CMP manufacturing, which includes the material consumption detail, and energy consumption detail such as annual energy consumption bills. Meanwhile, the manufacturer collects all relevant proof documents from the material suppliers and during the manufacturing stage to calculate the total Carbon Footprint of Products (CFP). At Stage III, the manufacturer sends the application files with the CFP result and all relevant proof documents to the certification organization for verification. At Stage IV, the certification organization will then issue the certificate to the manufacturer after successful verification.

Figure 4:
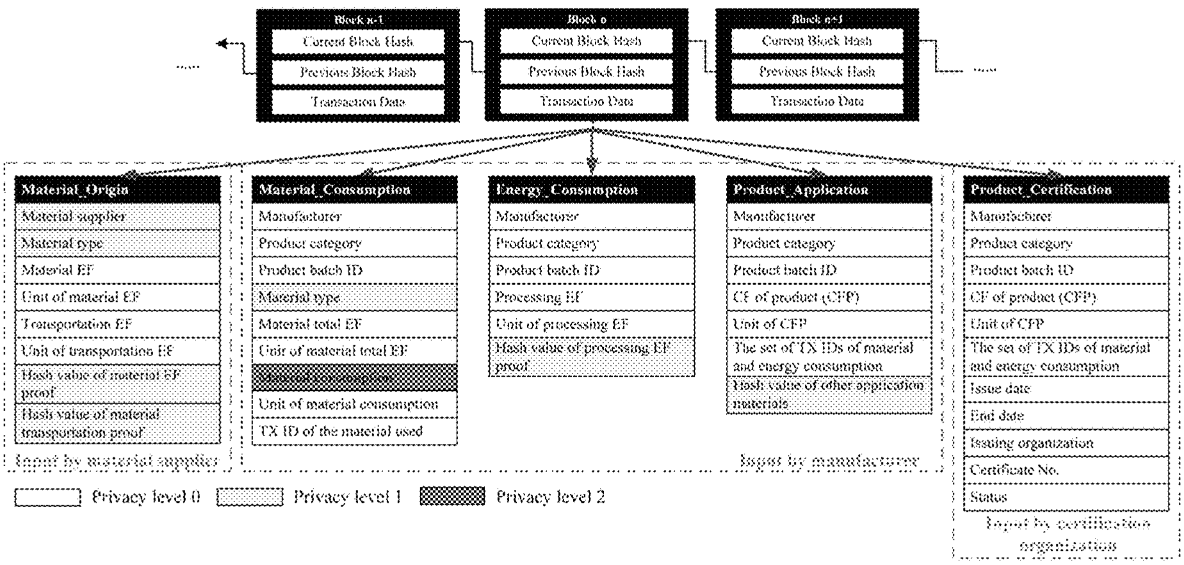
FIG. 4 shows a flow diagram illustrating an exemplary data model with multi-privacy levels, in accordance with an embodiment.

Further, the blockchain data model can be configured based on the carbon data or documents required for the certification process. With reference to FIG. 4, for material suppliers, user inputs can be modelled as material origin information. Specifically, it can contain basic supply chain information ("Material supplier" and "Material type"), material emission factors (EFs) from material extraction ("Material EF" and "Unit of material EF"), and EFs from upstream transportation ("Transportation EF" and "Unit of transportation EF"). This information can be obtained from the proof document(s) provided by the user, which in this case is the material supplier. In addition, the original proof documents containing information regarding material EF and transportation are also provided and stored in the blockchain network via the unique document hash value provided by IPFS. For manufacturers, there can be three types of user inputs corresponding to different activities as shown in FIG. 4. For example, material consumption and energy consumption information can be modelled to cover (1) the specific product information such as "Manufacturer", "Product category", and "Product batch ID", and (2) detailed quantity information affecting the CFP calculation such as "Material consumption" and "Processing EF". Another type of user input from the manufacturer is to send an application request in the GPChain, which includes the attributes of basic product information and all the relevant information record IDs during product manufacturing ("The set of TX IDs of material and energy consumption"). For certification organizations, their inputs are mainly related to the certificate information, which can be modelled, in GPChain, to cover certificate-related attributes such as "Issuing organization" and "Certificate No.". Referring back to FIG. 2, all these user inputs are provided in the data access layer and can generate corresponding blockchain transactions (in the smart contract layer) after they are processed, e.g., encrypted, etc., in the data privacy layer.

Additionally, while blockchain can offer considerable advantages in carbon management during CMP certification, the deployment of a blockchain-based CMP certification framework may raise concerns regarding the protection of sensitive carbon data, such as partner raw material suppliers of manufacturers and material consumption during CMP manufacturing, required in certification. Therefore, the blockchain data model, as shown in FIG. 4, considers the user's concerns regarding the privacy of sensitive carbon data during CMP certification by categorizing such data into three privacy levels. Details regarding the exemplary three privacy levels are provided as follows.

Privacy level 0: non-sensitive information that all the users of GPChain can access. For example, information provided in the certificates is transparent to all users as this information has been verified and certified by professional certification organizations. Further, since GPChain aims to provide efficient and reliable tracking of CMP carbon footprints, carbon emissions from the CMP's components and transportation, especially their EFs, can also be made transparent for public inspection.

Privacy level 1: private information that should only be accessed by intended recipients/users. For example, sensitive information that can only be shared between (1) material suppliers and manufacturers, and (2) manufacturers and certification organizations. Specifically, manufacturers may not be willing to share information regarding their business partners, such as suppliers, to the public (especially information on which raw material is provided by which material supplier). Therefore, "Material supplier", "Material type", and proof documents provided by suppliers can be identified as Privacy Level 1 information that should only be accessible to manufacturers and/or other authorized users. Similarly, when manufacturers submit certification requests to certification organizations, information such as proof documents should also be accessed only by the certification organization and/or authorized users for verification.

Privacy level 2: the most private and sensitive information that should be kept secret. For example, the quantity of "Material consumption" for a specific type of CMP can implicitly disclose the manufacturer companies' commercial secrets, such as product design, which can be detrimental if it is disclosed to other users, especially the manufacturers' competitors. From the perspective of manufacturers, the original material consumption data should only be accessed by themselves, whereas the total sum value of CFP based on the material consumption data can be accessed by certification organizations only for verification purposes, as required in CMP certification.

It should be understood that the information illustrated in FIG. 4 is not comprehensive and can include other relevant information, which the person skilled in the art would be able to assess and determine the Privacy Level of such information.

Therefore, embodiments of the present disclosure provide a blockchain data model for CMP certification with multi-privacy levels at the data access layer of the GPChain. This data model can be specific for blockchain-based CMP certification, which can (1) identify carbon data attributes that are stored and shared in the transparent blockchain network, and (2) consider and categorize these carbon data into the appropriate privacy levels based on the carbon data attributes under the context of CMP certification. However, we wish to highlight that the number of privacy levels is not limited to that described above, i.e., privacy levels 0 to 2, but can include more privacy level(s), e.g., privacy levels 0 to 3, 0 to 4, 0 to 5, etc., depending on the user's needs.

Privacy-Preserving Carbon Data-Sharing Strategy for CMP Certification

As described above, data labelled Privacy Level 1 and Privacy Level 2 should only be accessed by authorized user(s) to facilitate carbon data security during CMP certification. However, due to the distributed nature of blockchain that allows all users in the blockchain network to access the blockchain data, concerns regarding data security of such carbon data are raised. Therefore, embodiments of the present disclosure provide a privacy-preserving carbon data-sharing strategy, which integrates asymmetric and homomorphic encryption to facilitate data security and confidentiality during CMP certification. In an exemplary embodiment, the strategy can be implemented on Privacy Levels 1 and 2 carbon data. Specifically, for carbon data categorized under Privacy Level 1, i.e., carbon data that can be shared to the authorized user(s), the asymmetric encryption scheme can be used to encrypt the Privacy Level 1 carbon data and the authorized user(s) can own a private key for decrypting the carbon data that is encrypted using a corresponding public key so that the authorized user(s) can access the carbon data after decryption. Further, it should be noted that the public key of each user in the blockchain network is typically available to the public, i.e., all user(s) of the blockchain network, so that any user in the blockchain network who, for example, wants to send a message to another user can use the another user's public key to encrypt the message.

Figure 5:
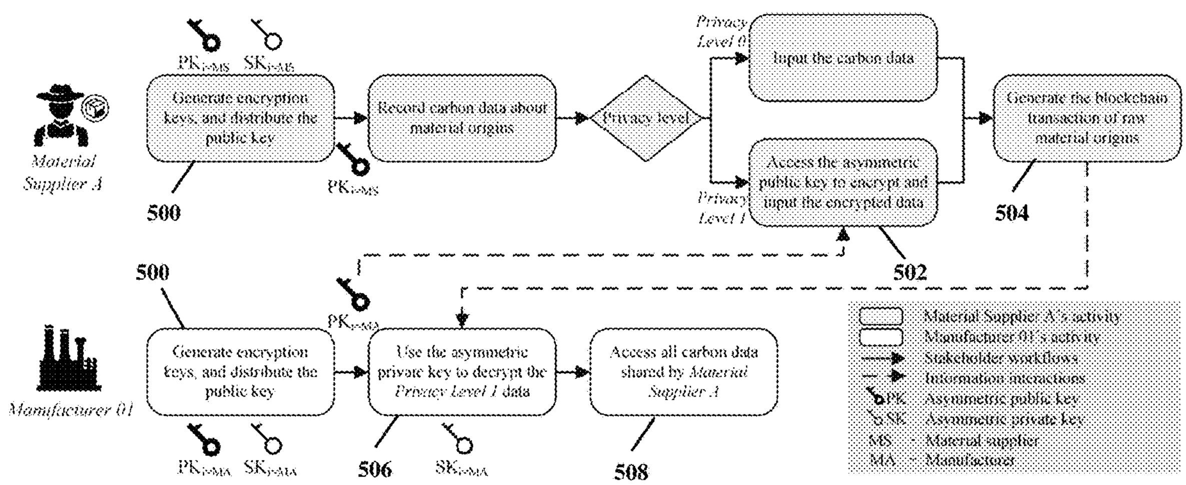
FIG. 5 shows a flow diagram illustrating an example process flow on how Privacy Level 1 carbon data is processed, in accordance with an embodiment.

FIG. 5 shows a flow diagram illustrating an exemplary process flow on how Privacy Level 1 carbon data can be processed in a transaction between Material Supplier A and Manufacturer 01 using the asymmetric encryption scheme as described above. As shown in FIG. 5, at 500, Material Supplier A and Manufacturer 01 distribute their asymmetric public keys via transactions in the blockchain network. At 502, when sharing Privacy Level 1 carbon data, e.g., "Material supplier", "Material type", etc., and the original hash values of proof documents, Material Supplier A encrypts the Privacy Level 1 carbon data using Manufacturer 01's public key, and the transaction with the encrypted Privacy Level 1 data is generated and broadcasted in the blockchain network at 504. At 506 and 508, Manufacturer 01 can decrypt the encrypted Privacy Level 1 carbon data by using a private key corresponding to Manufacturer 01's public key to access the original Privacy Level 1 carbon data that was shared by Material Supplier A, whereas the other users without the private key would not be able to decrypt the encrypted Private Level 1 carbon data.

For carbon footprint data categorized under Privacy Level 2, e.g., information that should only be accessed by the owner such as the consumption quantity of raw materials during the CMP manufacturing, the challenge is to perform calculation of the CMP's CFP without revealing each consumption quantity of raw materials in the blockchain network. However, asymmetric encryption typically does not enable algebraic operations to be performed while hiding the content of the data. Thus, embodiments of the present disclosure provide a solution to such problem by integrating homomorphic encryption into the privacy-preserving carbon data-sharing strategy. Particularly, homomorphic encryption is an encryption scheme that t can allow specific types of computation/operation to be performed on encrypted ciphertexts and generate an encrypted result. In other words, this encryption scheme can allow users to perform operations such as algebraic aggregation on a set of encrypted data without decrypting any data first, which allows the privacy of sensitive data to be preserved when performing specific operations.

Figure 6:
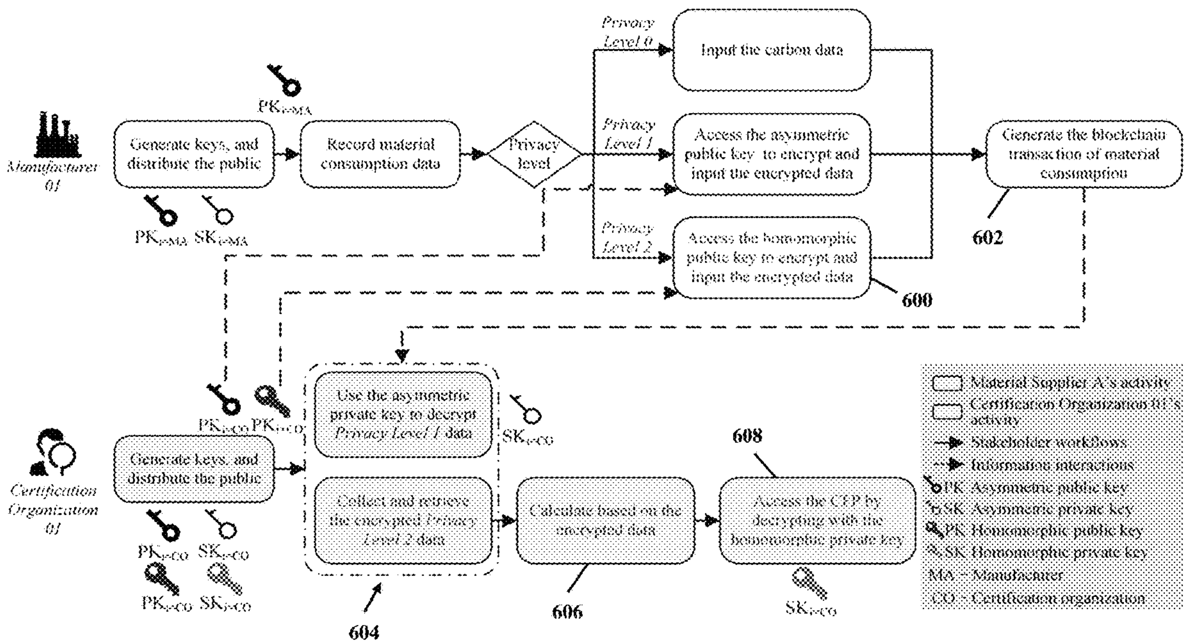
FIG. 6 shows a flow diagram illustrating an example process flow on how Privacy Level 2 carbon data is processed, in accordance with an embodiment.

FIG. 6 shows a flow diagram illustrating an exemplary process flow on how Privacy Level 2 carbon data can be processed in a transaction between Manufacturer 01 and Certification Organization 01. In particular, at 600, Privacy Level 2 carbon data, e.g., raw material consumption quantity for manufacturing a product, etc., is encrypted by Manufacturer 01 using Certification Organization 01's homomorphic public key. Subsequently, at 602, a blockchain transaction(s) is generated based on the encrypted Privacy Level 2 carbon data along with other processed carbon data at different privacy levels. During the CMP certification process, at 604, Certification Organization 01 collects all generated blockchain transaction(s) regarding the CMP's manufacturing and retrieves the homomorphically encrypted Privacy Level 2 data. At 606, the product's CFP can be calculated by obtaining the sum of each carbon emission (equal to the multiplication of EF and consumption quantity) based on the encrypted Privacy Level 2 data, i.e., performed while the Privacy Level 2 data is encrypted. As such, an encrypted aggregation result based on the calculation can be obtained. Finally, at 608, Certification Organization 01 can obtain the total CFP result of the CMP by decrypting the encrypted aggregation result using its homomorphic private key. Therefore, secure data aggregation during the certification process can be achieved by adopting the homomorphic encryption scheme, which can allow the carbon calculation function to performed while avoiding any leakage of the manufacturers' commercial secrets, i.e., Privacy Level 2 carbon data. Further, it may be worth highlighting that the process flow for processing Privacy Level 0 and 1 data as illustrated in FIG. 6 is identical or similar to that illustrated in FIG. 5.

In summary, embodiments of the present disclosure provide a privacy-preserving carbon data-sharing strategy in the data privacy layer as follows. First, different types of carbon data is categorized into different "Privacy Level", e.g., Privacy Level 0, Privacy Level 1, Privacy Level 2, etc., based on a multi-privacy blockchain data model, depending on the privacy requirement of the carbon data. Further, the privacy-preserving carbon data-sharing strategy can implement different encryption schemes, e.g., asymmetric and homomorphic encryption schemes, etc., on carbon data with different Privacy Levels. For example, the homomorphic encryption scheme can be used to encrypt Privacy Level 2 data such that operations can be performed on the encrypted Privacy Level 2 data while the data is encrypted. Therefore, the manufacturers' concerns on carbon data leakage may be mitigated using the carbon data-sharing strategy.

Figure 7:
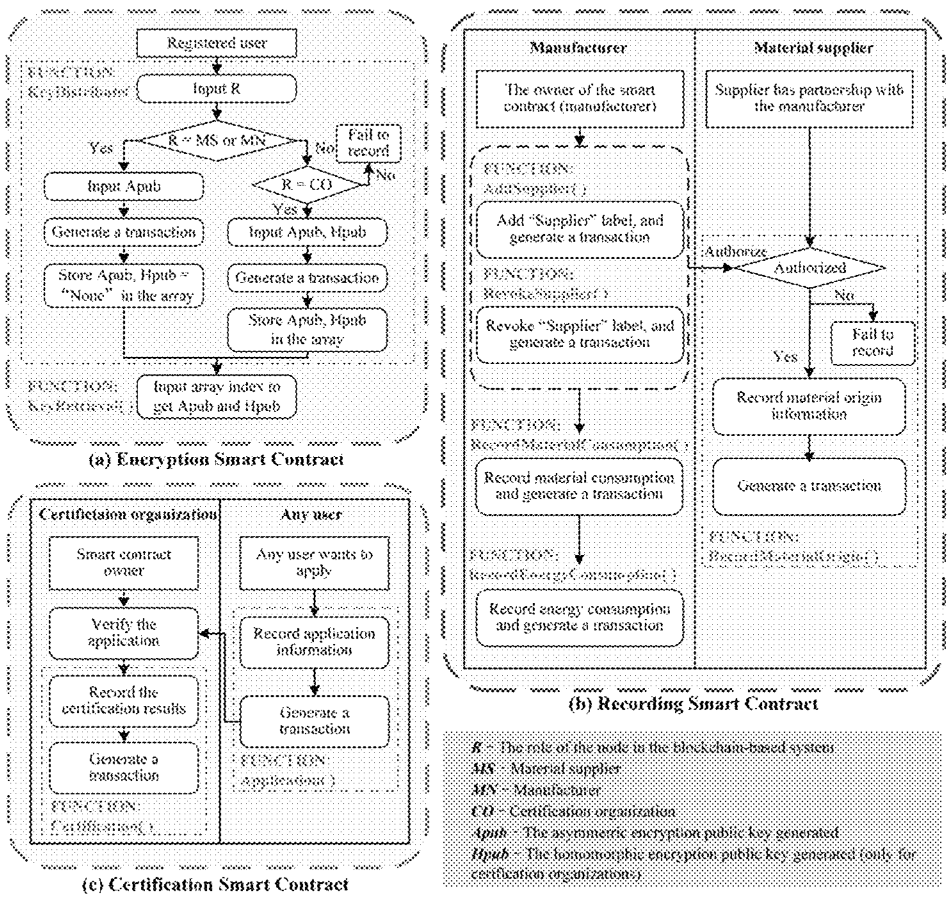
FIG. 7 shows flow diagrams illustrating example workflows for different smart contracts, in accordance with an embodiment.

Granular Access Control Smart Contracts for Blockchain-Based CMP Certification Additionally, embodiments of the present disclosure provide smart contracts with granular access control to control, or in some cases restrict, user interactions in the blockchain network, which enhances smart contract security and CMP certification credibility in a decentralized and transparent blockchain network. FIG. 7 shows a flow diagram illustrating execution workflows of three exemplary smart contracts used in GPChain, namely—(1) Encryption Smart Contract, a typical smart contract that enables all users in the blockchain network to distribute public keys for privacy protection, (2) Recording Smart Contract with granular access control, which can allow authorized users to invoke different smart contract functions for generating relevant types of transactions for carbon footprint recording during CMP certification, and (3) Certification Smart Contract with granular access control, which only allows specific professional certification organization(s) to invoke functions for generating transactions of CMP certificates. Exemplary algorithms of these smart contracts are shown in FIG. 8.

Referring back to FIGS. 7(*a*) to 7(*c*), further details regarding smart contracts (1) to (3) are also provided as follows.

- Encryption Smart Contract (FIG. 7(*a*)): This smart contract can include two main functions: key distribution and key retrieval. Both functions can be invoked by all users in the blockchain network. The main inputs of the key distribution function are public key(s) used for asymmetric encryption and homomorphic encryption (only for certification organizations), and, based on the provided input data, transactions including the user address and public key information can be generated as outputs. Further, as shown in FIG. 7(*a*), an array can be developed to store the public key information, and the array can be invoked by the key retrieval function to retrieve the public key(s) for data encryption at the data privacy layer.
- Recording Smart Contract (FIG. 7(*b*)): Typically, the manufacturer owns this smart contract. Granular access control can be provided in this smart contract for manufacturers to control or restrict user's access for invoking some of this smart contract's functions, which can help (1) avoid recording of irrelevant carbon transactions made by non-cooperative material suppliers and (2) improve efficiency of transaction management and carbon tracking by gathering relevant carbon recording transactions under the manufacturer's own smart contract. For example, a manufacturer can dynamically authorize specific material suppliers, e.g., suppliers who have partnerships with the manufacturer, to record material origin information under the smart contract address using the AddSupplier( ) and RevokeSupplier( ) functions. Further, these two functions can only be successfully invoked by the owner of the smart contract, i.e., the manufacturer. To better manage the generation of different types of transactions, only users who have obtained valid authorization from the manufacturer through the AddSupplier( ) function can call the RecordMaterialOrigin( ) function to generate transactions regarding material origin information (as shown in FIG. 4). For recording/uploading material consumption information, i.e., Privacy Level 2 data, to the blockchain network, it can only be done by the manufacturer by invoking the RecordMaterialConsumption( ) function. Similarly, the RecordEnergyConsumption( ) function is used for recording energy consumption information during product processing, which can only be invoked by the manufacturer.
- Certification Smart Contract (FIG. 7(*c*)): Typically, the certification organization owns this smart contract. In this smart contract, granular access control is provided for the smart contract's function that is used for generating transactions of CMP certification results. Specifically, only the certification organization can invoke this function, which can prevent malicious attempts to falsify CMP certification information. Further, as shown in FIG. 7(*c*), all relevant users can invoke the Application( ) function of this smart contract to generate application transactions. Whereas, only the specific or authorized certification organization can invoke the Certification( ) function, which is used for generation of certification results. Any attempt to invoke the Certification( ) function by unauthorized manufacturers will be rejected to ensure that the authority of certification organizations and the credibility of certification results are maintained.

In short, compared to traditional smart contracts, the above described smart contracts (1) to (3) can include granular access control, thereby providing the function of controlling or restricting certain smart contract functions to be invoked by authorized users only, which in turn controls user interactions within the blockchain network. Consequently, malicious activities, such as falsifying CMP certification results and extending CMP certification validity during blockchain-based CMP certification, can be avoided at the very beginning of the CMP certification life cycle. In addition, manufacturers may also better manage carbon recording transactions relevant to their CMPs by authorizing their partner material suppliers to invoke smart contract functions and generate transactions required in CMP certification. Moreover, the credibility of CMP certification results in blockchain transactions can be improved through these smart contracts since only the authorized certification organization(s) can invoke the relevant smart contract function(s).

Figure 9:
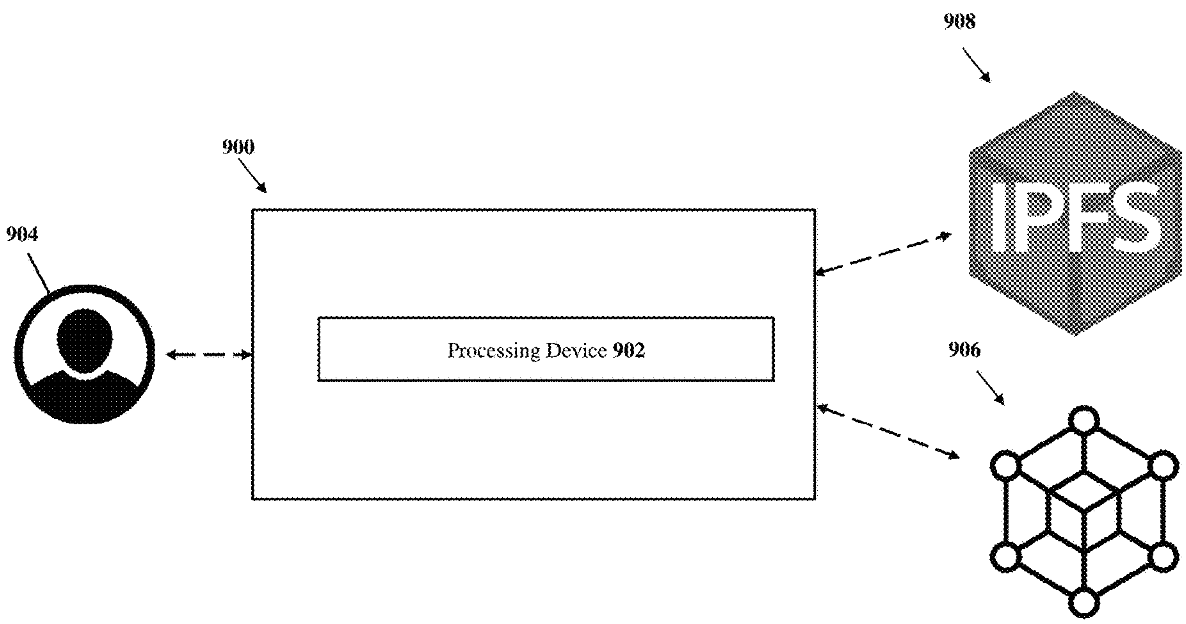
FIG. 9 shows a schematic diagram of an exemplary system for managing carbon data using a blockchain network, in accordance with an embodiment.
Figure 10:
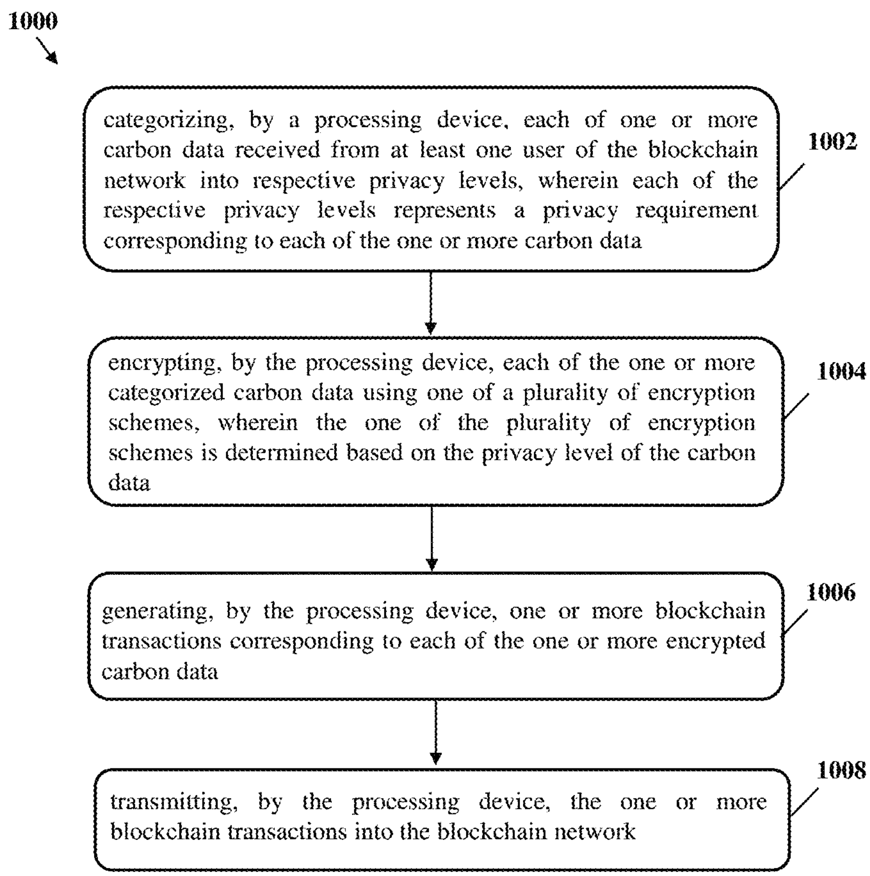
FIG. 10 shows a flow chart illustrating a method of managing carbon data using a blockchain network, in accordance with an embodiment.

With reference to FIGS. 9 and 10, embodiments of the present disclosure provide a method of managing carbon data using a blockchain network. The method 1000 can be implemented with system 900 as shown in FIG. 9, which shows a schematic diagram of the system 900 for managing carbon data using a blockchain network. The system 900 includes a processing device 902. A user(s) or user node(s) 904 can, for example, interact with the system 900 through a user interface of the system 900 (not shown in FIG. 9). Alternatively, the user 904 can interact with the system 900 using a mobile device (not shown in FIG. 9) communicatively coupled to the system 900. Nevertheless, the person skilled in the art would be able to recognize any other suitable ways of achieving the intended function. Further, the processing device 902 can be communicatively coupled to a blockchain network 906, for example, to transmit blockchain transactions into the blockchain network 906 and/or communicatively coupled to the IPFS platform 908 for storing or receiving carbon-related data.

With reference to FIG. 10, the method 1000 can include the following steps.

Step 1002: categorizing, by a processing device, each of one or more carbon data received from at least one user of the blockchain network into respective privacy levels. Each of the respective privacy levels represents a privacy requirement corresponding to each of the one or more carbon data.

Further, each of the one or more carbon data can include basic product information and/or manufacturing information of at least one construction material or product. In addition, the privacy requirement of each of the one or more carbon data can be predetermined based on the basic product information and/or the manufacturing information.

Step 1004: encrypting, by the processing device, each of the one or more categorized carbon data using one of a plurality of encryption schemes, wherein the one of the plurality of encryption schemes is determined based on the privacy level of the carbon data.

In one embodiment, the respective privacy levels can include first, second and third privacy levels. Further, the first privacy level carbon data can be accessible to all users in the blockchain network, the second privacy level carbon data can be accessible to users authorized by the owner of the carbon data, and the third privacy level carbon data can be accessible only by the owner of the carbon data. In this embodiment, the plurality of encryption schemes can include an asymmetric encryption scheme and a homomorphic encryption scheme. Furthermore, the first and second level privacy carbon data can be encrypted using the asymmetric encryption scheme, and the third level privacy level carbon data can be encrypted using the homomorphic encryption scheme.

Step 1006: generating, by the processing device, one or more blockchain transactions corresponding to each of the one or more encrypted carbon data.

The one or more blockchain transactions can be generated using one or more smart contracts. Further, at least one of the one or more smart contracts can be configured to only allow at least one user authorized by an owner of the at least one of the one or more smart contracts to invoke at least one function of the at least one of the one or more smart contracts.

Step 1008: transmitting, by the processing device, the one or more blockchain transactions into the blockchain network.

Optionally, the method 1000 can include a further step of: mapping, by the processing device, each of the one or more carbon data to a corresponding privacy level based on the predetermined privacy requirement.

Feasibility Demonstration

Figure 11:
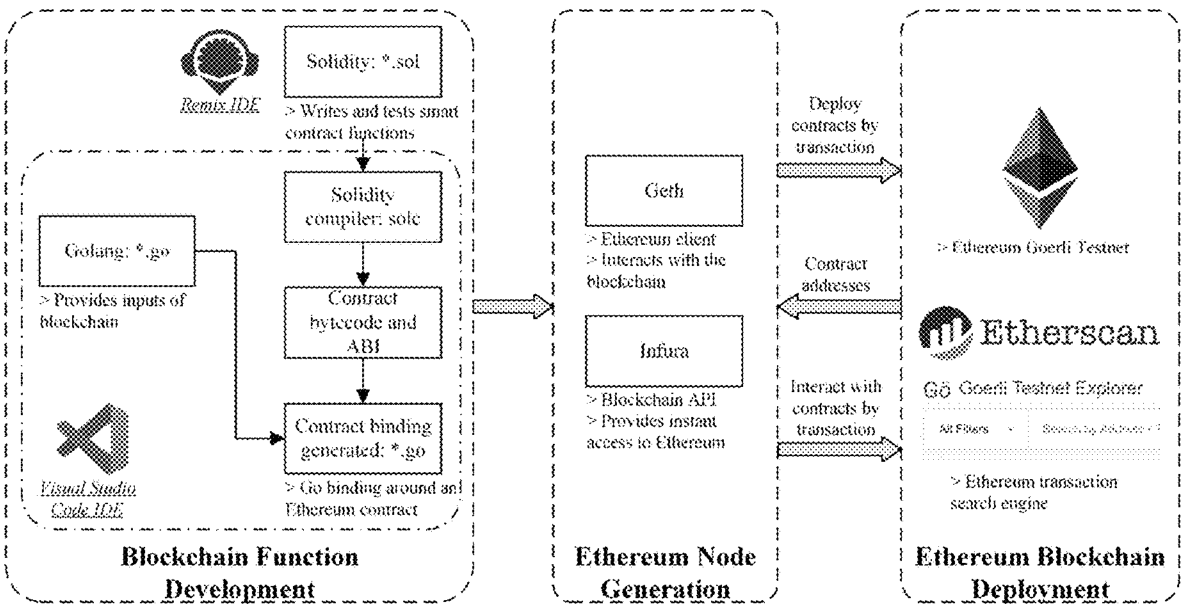
FIG. 11 shows a flow diagram illustrating an example workflow of implementing a framework for managing carbon data using a blockchain network, in accordance with an embodiment.
Figure 12:
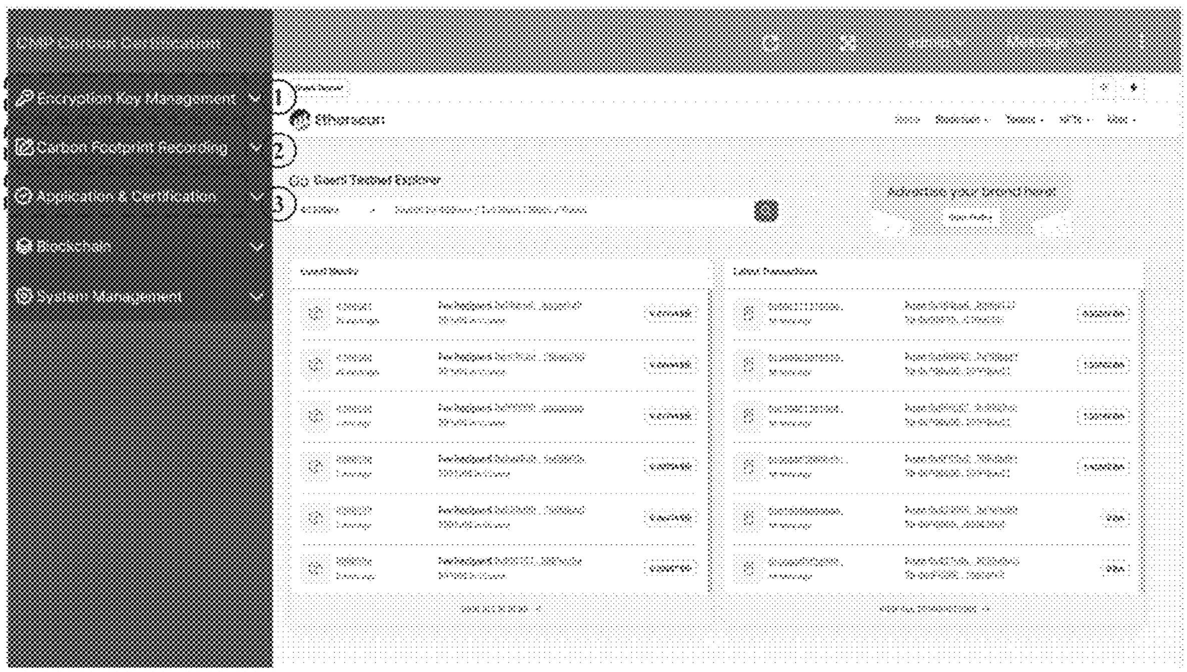
FIG. 12 shows an example of a User Interface display of a system for managing carbon data using a blockchain network, in accordance with an embodiment.

FIG. 11 illustrates an exemplary workflow for testing the implementation of GPChain, which includes, but not limited to, three main parts, namely (1) blockchain function development, (2) Ethereum node generation, and (3) Ethereum blockchain deployment. FIG. 12 shows an example of a User Interface (UI) of the GPChain, which includes, but not limited to, three main functionality modules, namely (1) encryption key management, (2) carbon footprint recording, and (3) application and certification. Users can invoke the modules to achieve different functionalities according to their roles and responsibilities. Further, in this example, Etherscan for Goerli testnet is integrated with the UI in the blockchain module so that users can track carbon footprints during CMP certification efficiently. To demonstrate the feasibility of GPChain, a real-life CMP carbon certification case of a test product (Concrete, 45/20D, 125 mm Slump) is selected to display the blockchain-based carbon management towards CMP certification. A scenario approach is adopted to demonstrate the carbon certification process using real data of the test product collected from materials and documents prepared for the Hong Kong CIC Green Product Certification scheme. For this demonstration, an Ethereum blockchain network including eight participants is established, namely the concrete manufacturer, the certification organization, and six material suppliers. The blockchain network is then deployed in two example carbon certification scenarios (presented below) to demonstrate the feasibility of GPChain.

Example Scenario 1: Recording Carbon Footprints for the CMP

Figure 13A:
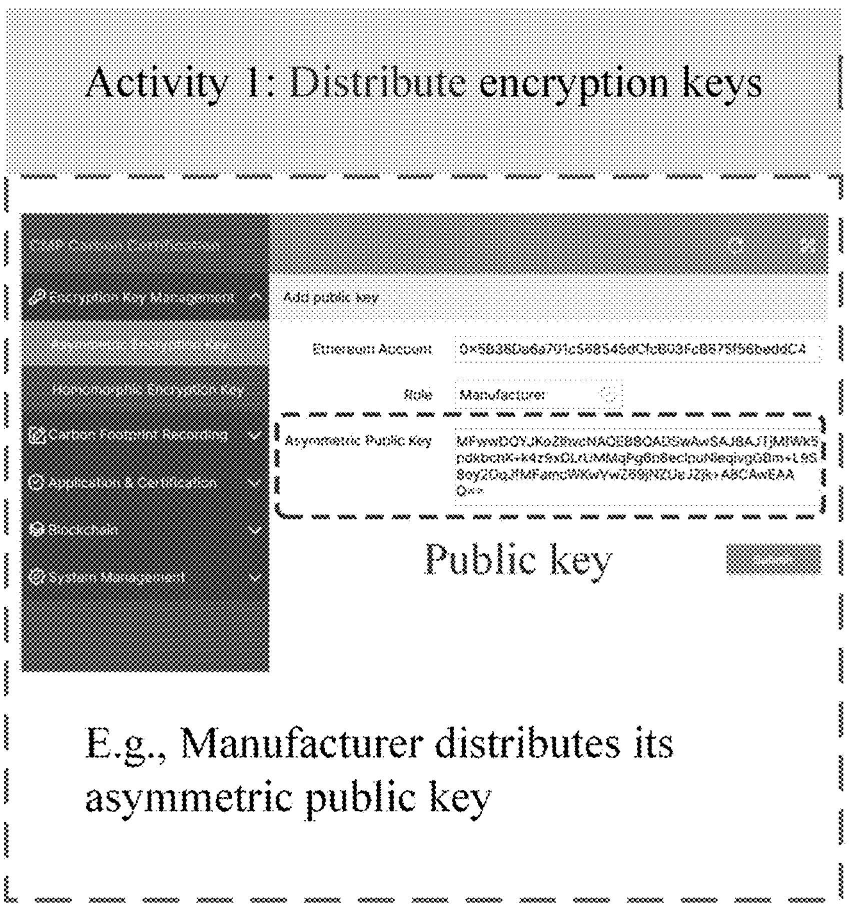
FIGS. 13A to C show a process flow of a first example scenario, in accordance with an embodiment.
Figure 13B:
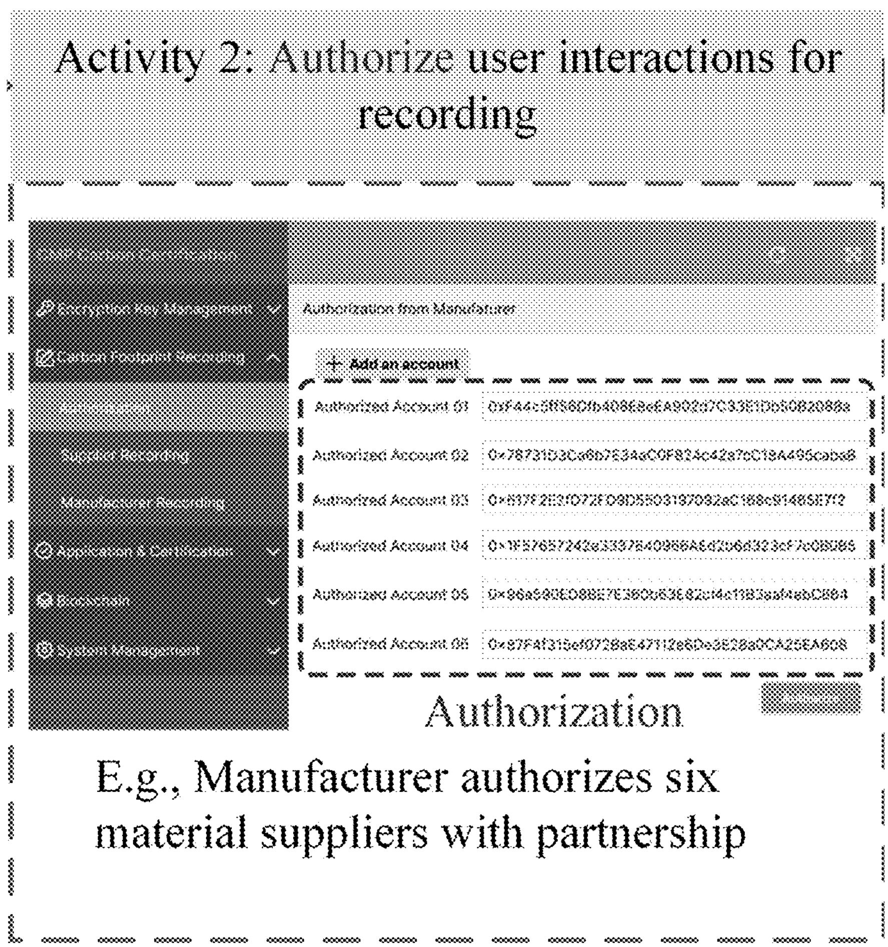
Figure 13C:
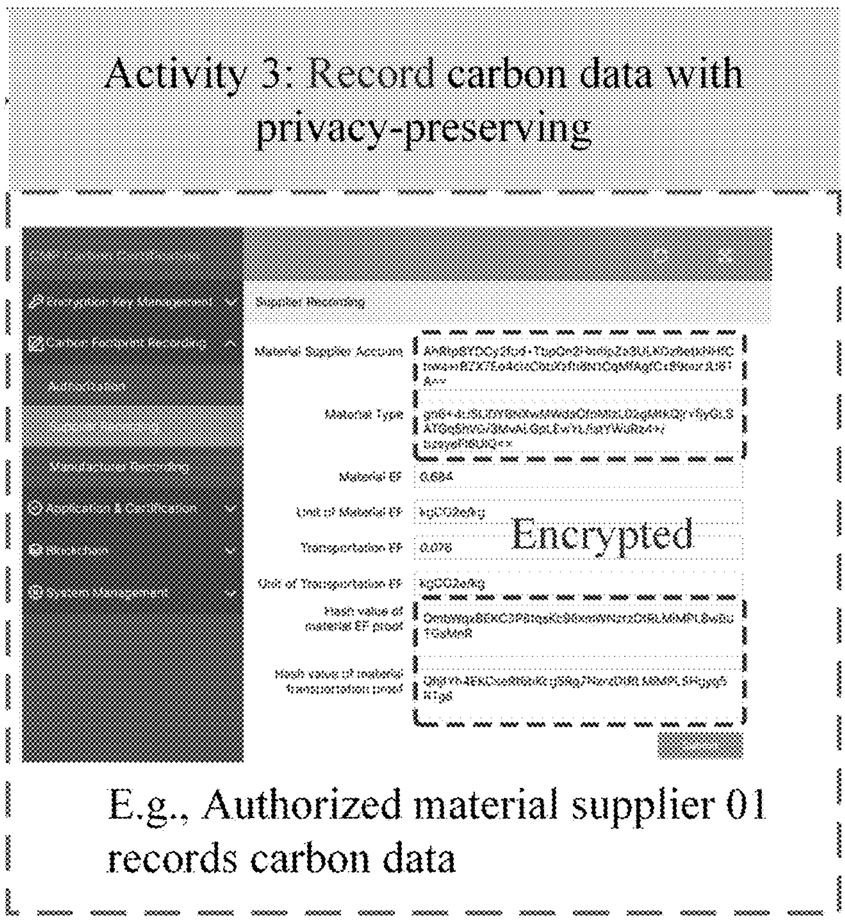

This example scenario largely describes the process of recording the carbon footprints of a CMP before further verification and certification are performed. It is designed to validate the workflow in GPChain for CMP certification, as well as validate the functionality of the developed carbon data privacy protection strategy and secure smart contract interaction scheme. FIGS. 13A to 13C show a process flow of example scenario 1, which includes three key activities. In Activities 1 and 2, all users in the blockchain network distribute their public keys (for asymmetric and homomorphic encryption) in the developed UI for sensitive carbon data-sharing. Then, the manufacturer authorizes its partner material suppliers via blockchain transactions so that these partner material suppliers can successfully invoke the recording functions based on the Recording Smart Contract to record the specific CMP's carbon footprints. In Activity 3, one authorized partner material supplier records the material's carbon footprint data by (1) encrypting its company name and the type of material with the manufacturer's asymmetric public key, (2) inputting the material's EF and transportation EF information directly, and (3) encrypting hash values (generated by IPFS) of proof documents corresponding to the material's EF information using the manufacturer's asymmetric public key. Note that FIGS. 13A to 13C mainly provides an example of how a material supplier can record carbon footprints for CMP certification. The process of recording carbon footprints in GPChain for manufacturers is similar, but can include an additional step of performing homomorphic encryption for material consumption quantities (using the certification organization's homomorphic public key), i.e., Privacy Level 2 carbon data.

The validation results of example scenario 1 are shown in FIG. 14. Specifically, the results show that (1) multiple users in the example scenario 1 have participated in GPChain and recorded corresponding carbon footprints under the same Recording Smart Contract via Ethereum transactions successfully, (2) the material supplier managed to record carbon footprints based on the secure smart contract interaction scheme in GPChain after obtaining authorization, and (3) the carbon footprint data in GPChain transactions is well protected via encryption and the original carbon data can only be accessed by the authorized users having corresponding private keys. Therefore, the objective of this example scenario is successfully validated.

Example Scenario 2: Application and Certification of the CMP

Figure 15A:
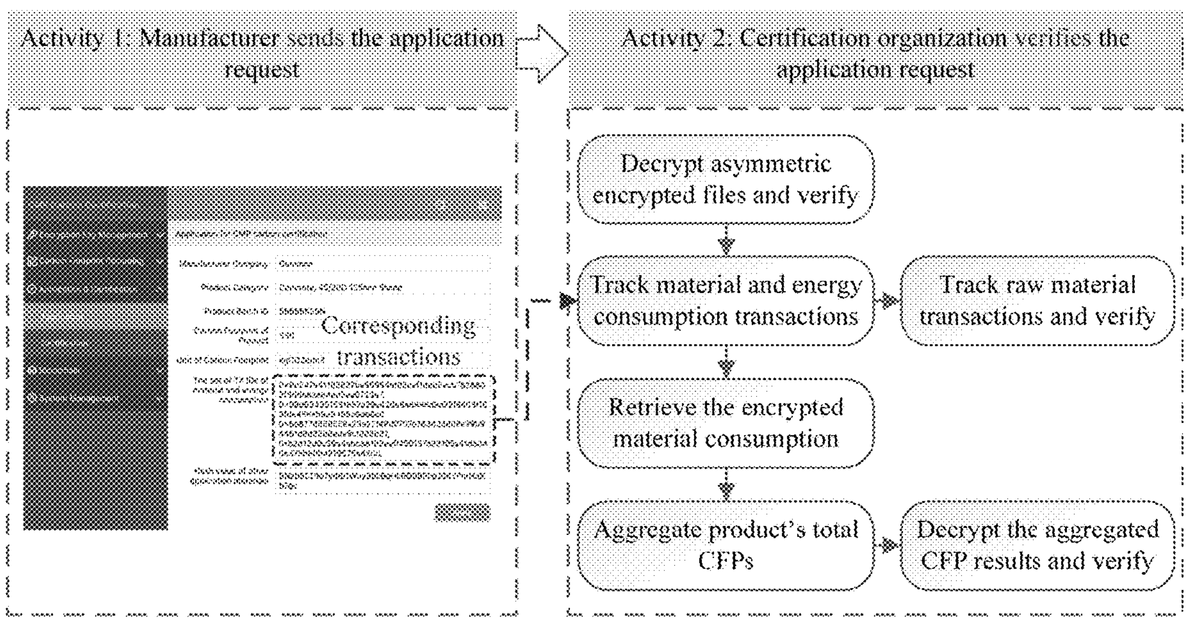
FIGS. 15A and 15B show a process flow of a second example scenario, in accordance with an embodiment.
Figure 15B:
Figure 16:
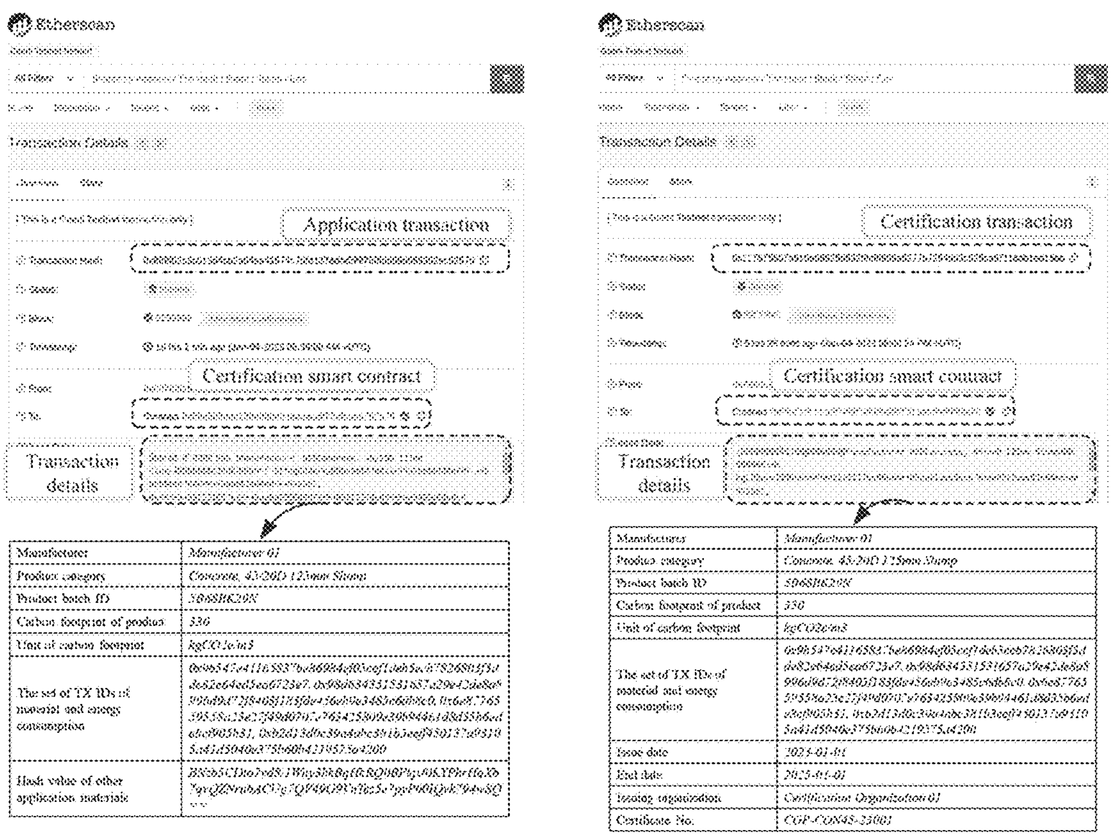
FIG. 16 shows validation results of a second example scenario, in accordance with an embodiment.

FIGS. 15A and 15B illustrate another example scenario to validate the application and certification process for the test product. As shown in FIGS. 15A and 15B, in Activity 1, the manufacturer first reports the basic information, e.g., product type, product batch, and total CFP, etc., regarding the test product. The manufacturer then collects all corresponding transactions, prepares other application files via the IPFS and encryption strategy, and sends an application request in the UI. Activity 2 illustrates the detailed verification process implemented by the certification organization after receiving the application request. The certification organization can access application materials from the IPFS after obtaining the decrypted hash value. Using the transaction ID provided in Activity 1, the certification organization can track each transaction for further verification. For transactions in this example scenario, the certification organization (1) decrypts the ciphertexts of material type and material EF proofs with the asymmetric private key to access raw information and verifies whether they are consistent with the transaction of the raw material recorded by material suppliers, and (2) retrieves the material total EF information and the homomorphically encrypted quantity information. The certification organization then performs secure aggregation to obtain the CFP actual value and compares it with the value reported in the application transaction. After successfully verifying corresponding transactions and proof documents, in Activity 3, the certification organization attaches the issuance and certificate information to generate a formal transaction for the certified test product, which is broadcasted in the blockchain network. The validation results of example scenario 2 are shown in FIG. 16. Specifically, the validation results show that the transactions for the application and certification processes are generated in the Ethereum blockchain network, respectively, and they are successfully distributed in the blockchain network, which can be searched in Etherscan. Hence, the objective of example scenario 2 is successfully validated.

Advantageously, the well-structured blockchain data format, i.e., splitting the blockchain model into "Data Access Layer", "Data Privacy Layer", etc., as shown in FIG. 2 in combination with the privacy schemes, i.e., categorizing the carbon data into different privacy levels, the Privacy-preserving Carbon Data-sharing Strategy, etc., as described above and shown in FIGS. 5 to 7 can enhance performance of GPChain by reducing the blockchain latency and improving throughput. Consequently, the cost for completing transactions using GPChain may be reduced. For example, as shown in FIGS. 14 and 16, the transactions in Example Scenarios 1 and 2 are generated without token-transferring, i.e., elimination of the use of tokenization, due to the transparent carbon certification functions designed for public service and well-structured blockchain data format for full coverage of information, which improves the performance of GPChain. The performance and cost evaluations of GPChain are provided in the sections below.

Performance Evaluation

Figure 17:
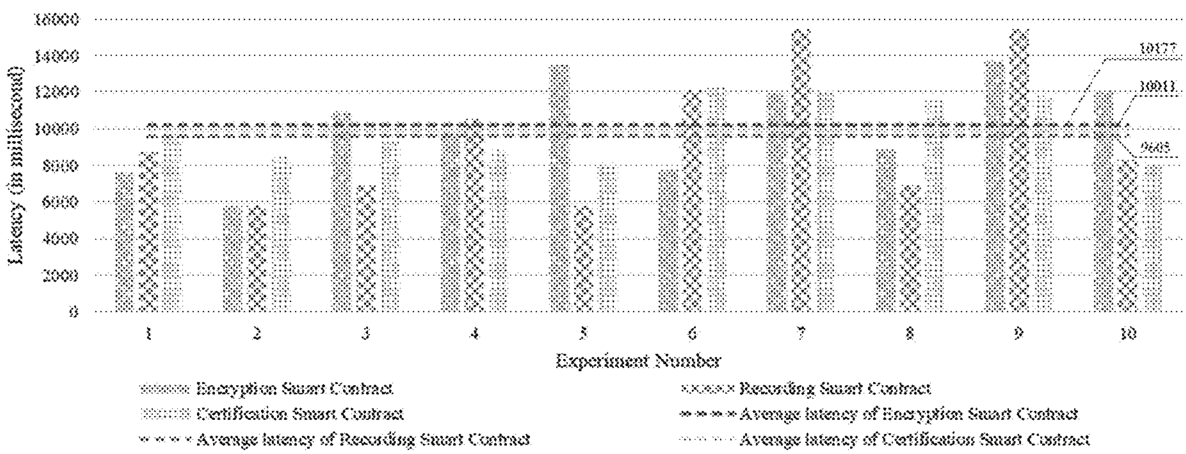
FIG. 17 shows a graph chart illustrating latencies of transactions generated based on Encryption Smart Contract, Recording Smart Contract and Certification Smart Contract, respectively, in accordance with an embodiment.
Figure 18:
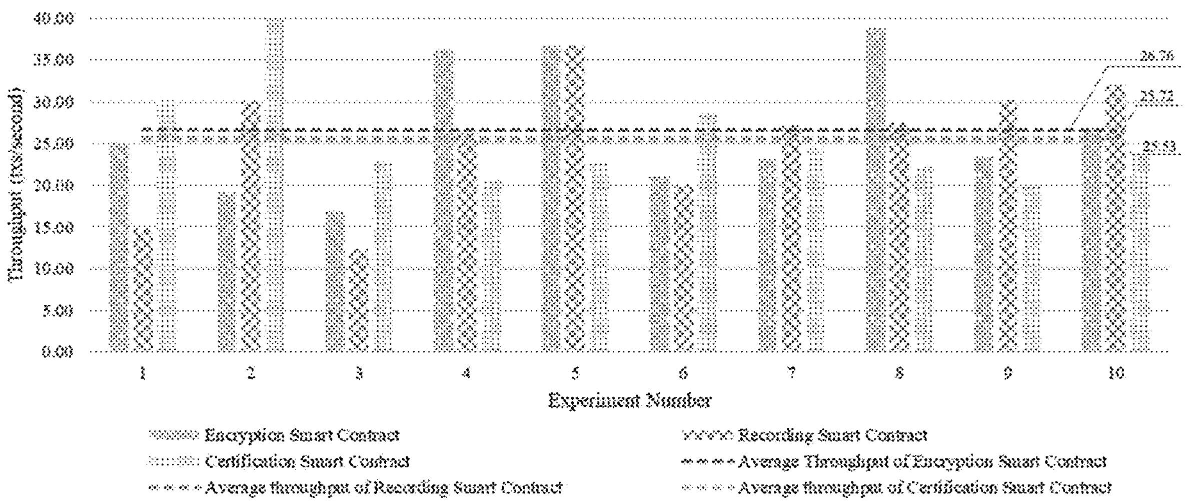
FIG. 18 shows a graph chart illustrating throughputs of transactions generated based on Encryption Smart Contract, Recording Smart Contract and Certification Smart Contract, respectively, in accordance with an embodiment.

In order to evaluate the performance of GPChain, two performance indicators, i.e., latency and throughput, are selected and tested for GPChain's smart contracts. Latency is typically defined as the time interval between the time when a transaction is first sent to the blockchain and the time when it is confirmed (as shown in Equation (1)) by the users of the blockchain network and is a measure of the data delivery efficiency of, in this case, transactions generated using GPChain's smart contracts. As such, latency can be used to assess the delay in transactions generated via different smart contracts in the GPChain. Throughput can be defined by the number of transactions per second (TPS) that a blockchain network can successfully process or be committed into blockchain ledgers within a given timeframe. It is the measure of the scalability of, in this case, GPChain's smart contracts, which can be used to show the bandwidth or scope of users that can access GPChain for different smart contracts at a given timeframe. Further, TPS can be calculated using Equation (2) below, which is based on dividing the number of transactions per block and the period of block generation. In this performance evaluation, the latency and TPS of three smart contracts, i.e., Encryption Smart Contract, Recording Smart Contract, and Certification Smart Contract, are measured respectively by invoking all functions of the respective smart contracts. The final values of latency and TPS for each smart contract are derived from taking the average of the latency and TPS calculated or measured for different invoked smart contract functions. Considering the limited testnet ETHs that can be obtained from Goerli, each activity to invoke the smart contract function is measured ten times. FIGS. 17 and 18 show the performance evaluation results of latency and throughput of the three smart contracts, respectively.

$$\text{Latency} = t_{Tx\,confirmed} - t_{Tx\,sent} \quad (1)$$

-continued $$TPS = \frac{Nubmber \text{ of transactions}}{\text{Block period}} \quad (2)$$

As shown in FIG. 17, the average latencies of Encryption Smart Contract, Recording Smart Contract, and Certification Smart Contract are all around 10 seconds, which indicates that it takes about 10 seconds for the user to generate a transaction containing carbon footprint information or carbon data and have it confirmed among the distributed ledgers in the blockchain network. As an Ethereum-based public blockchain network is used for this evaluation, certain time intervals are needed before most of the blockchain network users accept the transactions. In this regard, the average time for an Ethereum-based transaction to be completed is around 15 seconds. As can be seen, the latency of the three smart contracts, i.e., around 10 seconds, is faster than the average known latency of the Ethereum network, i.e., 15 seconds.

FIG. 18 shows the throughput results of Encryption Smart Contract, Recording Smart Contract, and Certification Smart Contract. A shown in FIG. 18, around 26.76, 25.72 and 25.53 transactions can be processed in each second for Encryption Smart Contract, Recording Smart Contract, and Certification Smart Contract, respectively. Considering that the average known throughput of the Ethereum platform is around 5.55 transactions per second, the throughputs of the three smart contracts, as shown in FIG. 18, show a significantly higher performance (almost five times) when compared to the average known throughput of the Ethereum platform, which means more transactions can be processed using GPChain.

Cost Evaluation

Differing from private blockchain platforms, users are required to pay transaction fees when executing transactions on a public blockchain platform, e.g., Ethereum, etc. Apart from the technical development and maintenance costs for a blockchain-based platform, it is also important to measure the execution cost of blockchain transactions in public blockchain platforms since fees are generated for each blockchain transaction to store data. In Ethereum, this transaction fee is represented by "Gas", which refers to the fee required to process a blockchain transaction successfully. As a fundamental network cost unit, Gas is typically paid using Ether (the cryptocurrency used in Ethereum) and is commonly used to evaluate a smart contract's economic performance and resource consumption. Therefore, in this evaluation, the Gas price (in Ether) is used for the cost estimation of each of the three smart contracts to evaluate their execution costs. The final execution costs for the three smart contracts are calculated by taking the average cost of the invoked functions, i.e., each function call is implemented ten times, then the average is taken.

Figure 19:
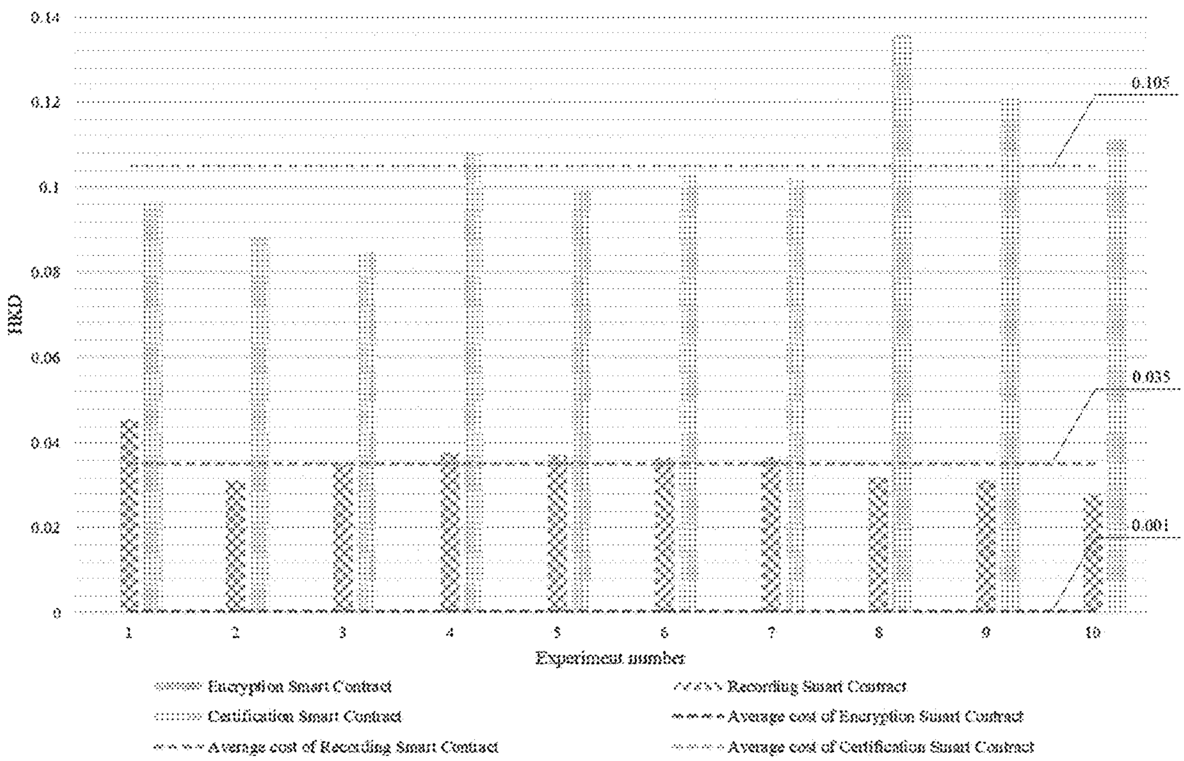
FIG. 19 shows a graph chart illustrating costs of transactions generated based on Encryption Smart Contract, Recording Smart Contract and Certification Smart Contract, respectively, in accordance with an embodiment.

FIG. 19 shows the average execution costs for each of the three smart contracts, i.e., Encryption Smart Contract, Recording Smart Contract, and Certification Smart Contract. In order to provide evaluation that is relatable to the real world market, the Gas price generated from each transaction (in Ether) is converted into Hong Kong dollars (HKD) according to the live Ethereum price monitored on 29 Dec. 2022 from Google Finance. With reference to FIG. 19, the average cost for each smart contract varies from around 0.001 to 0.105 HKD. The evaluation results show that low transaction fees are incurred for transactions based on Encryption Smart Contract, since transactions based on this smart contract contain minimal information relative to the other two smart contracts. On the other hand, each transaction based on Certification Smart Contract cost the highest at around 0.105 HKD (as such transaction typically contains the most information), and each transaction based on Recording Smart Contract cost around 0.035 HKD. As such, the total cost for the complete execution of the full product certification cycle (distribute encryption keys, authorize material suppliers, record carbon footprint information, send the application request, and broadcast the product certificate) using GPChain would cost about 0.46 HKD under the assumption that five users, i.e., three material suppliers, one manufacturer, and one certification organization, are participating in the certification process. Compared with a similar distributed service provided by Google Cloud Platform with a fixed component cost of 244.59 USD (approximately 1,960 HKD) per month for five participating users, GPChain evidently shows better economic performance and can execute more than 4,000 certification cycles for the same monthly maintenance cost of 244.59 USD.

Figure 20:
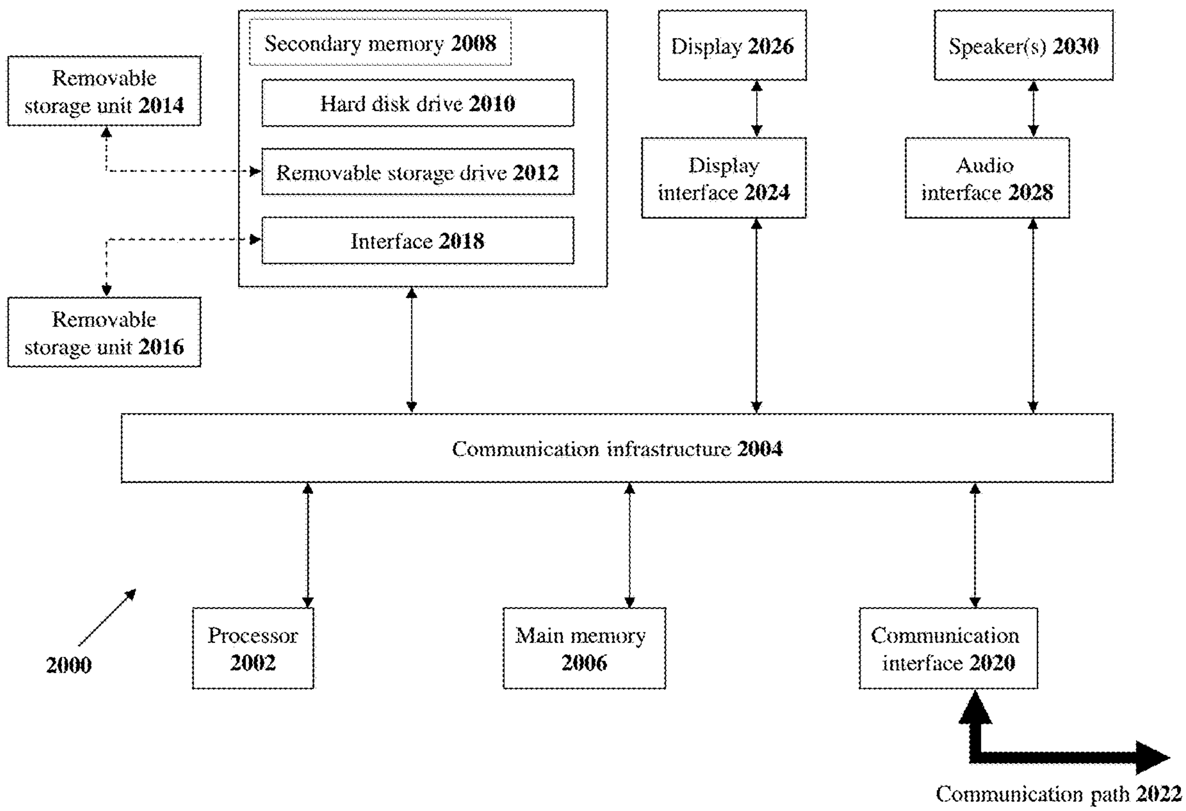
FIG. 20 shows a schematic diagram of an exemplary computing device used to realise a system for managing carbon data using a blockchain network, in accordance with an embodiment.

FIG. 20 depicts an exemplary computing device 2000, hereinafter interchangeably referred to as a computer system 2000. The following description of the computing device 2000 is provided by way of example only and is not intended to be limiting.

As shown in FIG. 20, the example computing device 2000 includes a processor 2002 for executing software routines. Although a single processor is shown for the sake of clarity, the computing device 2000 may also include a multiprocessor system. The processor 2002 is connected to a communication infrastructure 2004 for communication with other components of the computing device 2000. The communication infrastructure 2004 may include, for example, a communications bus, cross-bar, or network.

The computing device 2000 further includes a main memory 2006, such as a random access memory (RAM), and a secondary memory 2008. The secondary memory 2008 may include, for example, a hard disk drive 2010 and/or a removable storage drive 2012, which may include a floppy disk drive, a magnetic tape drive, an optical disk drive, or the like. The removable storage drive 2012 reads from and/or writes to a removable storage unit 2014 in a well-known manner. The removable storage unit 2014 may include a floppy disk, magnetic tape, optical disk, or the like, which is read by and written to by removable storage drive 2012. As will be appreciated by persons skilled in the relevant art(s), the removable storage unit 2014 includes a computer readable storage medium having stored therein computer executable program code instructions and/or data.

In an alternative implementation, the secondary memory 2008 may additionally or alternatively include other similar means for allowing computer programs or other instructions to be loaded into the computing device 2000. Such means can include, for example, a removable storage unit 2016 and an interface 2018. Examples of a removable storage unit 2016 and interface 2018 include a program cartridge and cartridge interface (such as that found in video game console devices), a removable memory chip (such as an EPROM or PROM) and associated socket, and other removable storage units 2016 and interfaces 2018 which allow software and data to be transferred from the removable storage unit 2016 to the computer system 2000.

The computing device 2000 also includes at least one communication interface 2020. The communication interface 2020 allows software and data to be transferred between computing device 2000 and external devices via a communication path 2022. In various embodiments of the inventions, the communication interface 2020 permits data to be transferred between the computing device 2000 and a data communication network, such as a public data or private data communication network. The communication interface 2020 may be used to exchange data between different computing devices 2000 which such computing devices 2000 form part an interconnected computer network. Examples of a communication interface 2020 can include a modem, a network interface (such as an Ethernet card), a communication port, an antenna with associated circuitry and the like. The communication interface 2020 may be wired or may be wireless. Software and data transferred via the communication interface 2020 are in the form of signals which can be electronic, electromagnetic, optical or other signals capable of being received by communication interface 2020. These signals are provided to the communication interface via the communication path 2022.

As shown in FIG. 20, the computing device 2000 further includes a display interface 2024 which performs operations for rendering images to an associated display 2026 and an audio interface 2028 for performing operations for playing audio content via associated speaker(s) 2030.

As used herein, the term "computer program product" may refer, in part, to removable storage unit 2014, removable storage unit 2016, a hard disk installed in hard disk drive 2010, or a carrier wave carrying software over communication path 2022 (wireless link or cable) to communication interface 2020. Computer readable storage media refers to any non-transitory tangible storage medium that provides recorded instructions and/or data to the computing device 2000 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computing device 2000. Examples of transitory or non-tangible computer readable transmission media that may also participate in the provision of software, application programs, instructions and/or data to the computing device 2000 include radio or infra-red transmission channels as well as a network connection to another computer or networked device, and the Internet or Intranets including e-mail transmissions and information recorded on Websites and the like.

The computer programs (also called computer program code) are stored in main memory 2006 and/or secondary memory 2008. Computer programs can also be received via the communication interface 2020. Such computer programs, when executed, enable the computing device 2000 to perform one or more features of embodiments discussed herein. In various embodiments, the computer programs, when executed, enable the processor 2002 to perform features of the above-described embodiments. Accordingly, such computer programs represent controllers of the computer system 2000.

Software may be stored in a computer program product and loaded into the computing device 2000 using the removable storage drive 2012, the hard disk drive 2010, or the interface 2018. Alternatively, the computer program product may be downloaded to the computer system 2000 over the communications path 2022. The software, when executed by the processor 2002, causes the computing device 2000 to perform functions of embodiments described herein.

It is to be understood that the embodiment of FIG. 20 is presented merely by way of example. Therefore, in some embodiments one or more features of the computing device 2000 may be omitted. Also, in some embodiments, one or more features of the computing device 2000 may be combined together. Additionally, in some embodiments, one or more features of the computing device 2000 may be split into one or more component parts.

It will be appreciated that the elements illustrated in FIG. 20 function to provide means for performing the various functions and operations of the servers as described in the above embodiments.

In an implementation, a server may be generally described as a physical device comprising at least one processor and at least one memory including computer program code. The at least one memory and the computer program code are configured to, with the at least one processor, cause the physical device to perform the requisite operations.

When the computing device 2000 is configured to realise the system 900 for managing carbon data using a blockchain network, the system 900 can have a non-transitory computer readable medium having stored thereon an application which when executed causes the system 900 to perform the method 1000, which includes steps 1000 to 1008 as follows.

Step 1002: categorizing, by a processing device, each of one or more carbon data received from at least one user of the blockchain network into respective privacy levels. Each of the respective privacy levels represents a privacy requirement corresponding to each of the one or more carbon data.

Further, each of the one or more carbon data can include basic product information and/or manufacturing information of at least one construction material or product. In addition, the privacy requirement of each of the one or more carbon data can be predetermined based on the basic product information and/or the manufacturing information.

Step 1004: encrypting, by the processing device, each of the one or more categorized carbon data using one of a plurality of encryption schemes, wherein the one of the plurality of encryption schemes is determined based on the privacy level of the carbon data.

In one embodiment, the respective privacy levels can include first, second and third privacy levels. Further, the first privacy level carbon data can be accessible to all users in the blockchain network, the second privacy level carbon data can be accessible to users authorized by the owner of the carbon data, and the third privacy level carbon data can be accessible only by the owner of the carbon data. In this embodiment, the plurality of encryption schemes can include an asymmetric encryption scheme and a homomorphic encryption scheme. Furthermore, the first and second level privacy carbon data can be encrypted using the asymmetric encryption scheme, and the third level privacy level carbon data can be encrypted using the homomorphic encryption scheme.

Step 1006: generating, by the processing device, one or more blockchain transactions corresponding to each of the one or more encrypted carbon data.

The one or more blockchain transactions can be generated using one or more smart contracts. Further, at least one of the one or more smart contracts can be configured to only allow at least one user authorized by an owner of the at least one of the one or more smart contracts to invoke at least one function of the at least one of the one or more smart contracts.

Step 1008: transmitting, by the processing device, the one or more blockchain transactions into the blockchain network.

Optionally, the method 1000 can include a further step of: mapping, by the processing device, each of the one or more carbon data to a corresponding privacy level based on the predetermined privacy requirement.

CONCLUSION

In conclusion, embodiments of the present disclosure provide a blockchain-based framework for secure carbon management during CMP certification. Compared with existing processes that proposed theoretical frameworks for construction carbon management, the proposed blockchain-based framework and workflow are designed based on real-life case studies, i.e., not at the conceptual level. Firstly, embodiments of the present disclosure provide a blockchain data model with multi-privacy levels for CMP certification that can identify the carbon data provided by user(s) in the blockchain network and their sensitivity/privacy requirement, of which the data can be categorized into different privacy levels based on the privacy requirement of each carbon data. In addition, the blockchain-based framework can also provide structured flow of carbon data and information for CMP certification in the blockchain environment. Further, embodiments of the present disclosure provide a fine-grained privacy-preserving carbon data-sharing strategy for sensitive carbon data required in CMP certification. The privacy-preserving carbon data-sharing strategy can enable fine-grained security protection for sensitive carbon data by integrating asymmetric encryption and homomorphic encryption schemes with blockchain, which particularly satisfies secure carbon data-sharing requirements from different privacy levels. Furthermore, embodiments of the present disclosure also provide granular access control smart contracts to enable secure user interactions in blockchain-based CMP carbon certification. Specifically, the granular access control can directly control or restrict users from invoking certain smart contracts or smart contract functions.

Finally, future work can be directed to (1) developing a comprehensive blockchain-based application for CMP carbon certification by including user registration and access control of reading and writing data, which would be helpful to improve the user experience for further promotion in the whole industry and (2) integration with international standards for carbon footprint quantification and reporting to provide a standardized carbon management process for users.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A method of managing one or more carbon data by using a blockchain network, the one or more carbon data being used for a certifying process of certifying a plurality of construction materials and products (CMPs), the method comprising:

categorizing, by a computing device, each of the one or more carbon data received from at least one user of the blockchain network into respective privacy levels, wherein each of the respective privacy levels represents a privacy requirement corresponding to each of the one or more carbon data, wherein each of the one or more carbon data comprises basic product information or manufacturing information of at least one construction material or product in the plurality of CMPs, and wherein the privacy requirement of each of the one or more carbon data is predetermined based on the basic product information or the manufacturing information;

encrypting, by the computing device, each of the one or more categorized carbon data using one of a plurality of encryption schemes, wherein the one of the plurality of encryption schemes is determined based on the privacy level of the carbon data;

generating, by the computing device, one or more blockchain transactions corresponding to each of the one or more encrypted carbon data;

transmitting, by the computing device, the one or more blockchain transactions into the blockchain network; and assessing, by the computing device, carbon footprints of the plurality of CMPs to certify the plurality of CMPs in the certification process according to respective blockchain transactions in the blockchain network.

2. The method of claim 1, wherein the method further comprises:

mapping, by the computing device, each of the one or more carbon data to a corresponding privacy level based on the predetermined privacy requirement.

3. The method of claim 1, wherein the respective privacy levels comprise first, second and third privacy levels, and wherein the first privacy level carbon data is accessible to all users in the blockchain network, the second privacy level carbon data is accessible to users authorized by the owner of the carbon data, and the third privacy level carbon data is accessible only by the owner of the carbon data.

4. The method of claim 3, wherein the plurality of encryption schemes comprise an asymmetric encryption scheme and a homomorphic encryption scheme, wherein the first and second level privacy carbon data are encrypted using the asymmetric encryption scheme, and wherein the third level privacy level carbon data is encrypted using the homomorphic encryption scheme.

5. The method of claim 1, wherein the one or more blockchain transactions is generated using one or more smart contracts, and wherein at least one of the one or more smart contracts is configured to only allow at least one user authorized by an owner of the at least one of the one or more smart contracts to invoke at least one function of the at least one of the one or more smart contracts.

6. The method of claim 5, wherein the method is implemented based on a blockchain-based model, and wherein the blockchain-based model comprises an architecture having:

a data access layer, wherein the categorizing step is performed in the data access layer;

a data privacy layer, wherein the encrypting step is performed in the data privacy layer; and a smart contract layer, wherein the generating step is performed in the smart contract layer.

7. A system for managing one or more carbon data, the one or more carbon data being used for a certifying process of certifying a plurality of construction materials and products (CMPs), wherein the system comprises a blockchain network and a computing device, the computing device being configured to:

categorize each of the one or more carbon data received from at least one user of the blockchain network into respective privacy levels, wherein each of the respective privacy levels represents a privacy requirement corresponding to each of the one or more carbon data, wherein each of the one or more carbon data comprises basic product information or manufacturing information of at least one construction material or product in the plurality of CMPs, and wherein the privacy requirement of each of the one or more carbon data is predetermined based on the basic product information or the manufacturing information;

encrypt each of the one or more categorized carbon data using one of a plurality of encryption schemes, wherein the one of the plurality of encryption schemes is determined based on the privacy level of the carbon data;

generate one or more blockchain transactions corresponding to each of the one or more encrypted carbon data; and transmit the one or more blockchain transactions into the blockchain network; and assess carbon footprints of the plurality of CMPs to certify the plurality of CMPs in the certification process according to respective blockchain transactions in the blockchain network.

8. The system of claim 7, wherein the computing device is further configured to:

map each of the one or more carbon data to a corresponding privacy level based on the predetermined privacy requirement.

9. The system of claim 7, wherein the respective privacy levels comprise first, second and third privacy levels, and wherein the first privacy level carbon data is accessible to all users in the blockchain network, the second privacy level carbon data is accessible to users authorized by the owner of the carbon data, and the third privacy level carbon data is accessible only by the owner of the carbon data.

10. The system of claim 9, wherein the plurality of encryption schemes comprise an asymmetric encryption scheme and a homomorphic encryption scheme, wherein the first and second level privacy carbon data are encrypted using the asymmetric encryption scheme, and wherein the third level privacy level carbon data is encrypted using the homomorphic encryption scheme.

11. The system of claim 7, wherein the one or more blockchain transactions is generated using one or more smart contracts, and wherein at least one of the one or more smart contracts is configured to only allow at least one user authorized by an owner of the at least one of the one or more smart contracts to invoke at least one function of the at least one of the one or more smart contracts.

12. The system of claim 11, wherein the computing device is further configured to implement a blockchain-based model, and wherein the blockchain-based model comprises an architecture having:

a data access layer, wherein each of the one or more carbon data received from the at least one user of the blockchain network is categorized into the respective privacy levels in the data access layer;

a data privacy layer, wherein each of the one or more categorized carbon data is encrypted using one of the plurality of encryption schemes in the data privacy layer; and a smart contract layer, wherein the one or more blockchain transactions corresponding to each of the one or more encrypted carbon data is generated in the smart contract layer.

* * * * *